(12) United States Patent
Uchida et al.

(10) Patent No.: US 9,673,453 B2
(45) Date of Patent: Jun. 6, 2017

(54) METHOD FOR MANUFACTURING LITHIUM ION SECONDARY BATTERY

(75) Inventors: Yozo Uchida, Toyota (JP); Nobuyuki Yamazaki, Toyota (JP); Tomohide Sumi, Aichi-ken (JP); Tomohiko Ishida, Nisshin (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 228 days.

(21) Appl. No.: 13/991,186

(22) PCT Filed: Dec. 6, 2010

(86) PCT No.: PCT/JP2010/071852
§ 371 (c)(1),
(2), (4) Date: Jun. 3, 2013

(87) PCT Pub. No.: WO2012/077177
PCT Pub. Date: Jun. 14, 2012

(65) Prior Publication Data
US 2013/0255074 A1    Oct. 3, 2013

(51) Int. Cl.
*H01M 4/139* (2010.01)
*H01M 4/1393* (2010.01)
(Continued)

(52) U.S. Cl.
CPC ......... *H01M 4/622* (2013.01); *H01M 4/0404* (2013.01); *H01M 4/139* (2013.01);
(Continued)

(58) Field of Classification Search
None
See application file for complete search history.

(56) References Cited

U.S. PATENT DOCUMENTS 5,879,417 A * 3/1999 Yamada et al. .............. 29/623.5
6,887,617 B2   5/2005 Sato et al.
(Continued)

FOREIGN PATENT DOCUMENTS

CN   1235298 C   1/2006
CN   101662014   3/2010
(Continued)

OTHER PUBLICATIONS

Office Action issued in corresponding U.S. Appl. No. 14/078,943 dated Nov. 12, 2015.
(Continued)

*Primary Examiner* — Daniel Gatewood
(74) *Attorney, Agent, or Firm* — Finnegan, Henderson, Farabow, Garrett & Dunner, LLP

(57) ABSTRACT

The method for manufacturing a lithium ion secondary battery includes a binder coating step (18), a mixture supplying step (20), a magnetic field applying step (22), and a convection generating step (24). The binder coating step (18) is a step of coating a slurry-form binder (18a) on a metal foil (12a) (collector). The mixture supplying step (20) is a step of supplying a negative electrode mixture containing graphite so as to be superposed on the slurry-form binder (18a) coated on the metal foil (12a) in the binder coating step (18). The magnetic field applying step (22) is a step of applying a magnetic field having magnetic lines of force pointing in the direction orthogonal to the metal foil (12a), to the negative electrode mixture (20a) coated on the metal foil (12a) in the mixture supplying step (20). Further, the convection generating step (24) is a step of generating convection in the negative electrode mixture (20a) by applying heat to the negative electrode mixture (20a) to which a magnetic field has been applied in the magnetic field applying step (22).

9 Claims, 18 Drawing Sheets

(51) Int. Cl.
    *H01M 4/62*      (2006.01)
    *H01M 4/04*      (2006.01)
    *H01M 4/587*     (2010.01)

(52) U.S. Cl.
    CPC ......... *H01M 4/1393* (2013.01); *H01M 4/587* (2013.01); *H01M 4/621* (2013.01); *Y02P 70/54* (2015.11); *Y10T 29/49115* (2015.01)

(56) References Cited

U.S. PATENT DOCUMENTS

| | | | |
|---|---|---|---|
| 2001/0044045 A1 | 11/2001 | Sato et al. | |
| 2004/0072076 A1* | 4/2004 | Matsubara et al. | 429/231.8 |
| 2005/0241137 A1* | 11/2005 | Suzuki | H01G 9/042 29/592.1 |
| 2006/0062717 A1 | 3/2006 | Tokuoka et al. | |
| 2009/0123850 A1* | 5/2009 | Takeuchi et al. | 429/342 |
| 2009/0202907 A1 | 8/2009 | Muraoka et al. | |
| 2010/0273052 A1* | 10/2010 | Sakitani et al. | 429/217 |

FOREIGN PATENT DOCUMENTS

| | | |
|---|---|---|
| JP | 10-284059 | 10/1992 |
| JP | 2001-307716 | 11/2001 |
| JP | 2003173780 A * | 6/2003 |
| JP | 2003-197182 | 7/2003 |
| JP | 2003-197189 | 7/2003 |
| JP | 2006-83030 | 3/2006 |
| JP | 2006-127823 | 5/2006 |
| JP | 2006-252945 | 9/2006 |
| JP | 2008-152946 | 7/2008 |
| JP | 2008258055 | 10/2008 |
| JP | 2009-238720 | 10/2009 |

OTHER PUBLICATIONS

Final Office Action issued on May 13, 2016 in U.S. Appl. No. 14/078,943.

Office Action issued in U.S. Appl. No. 14/078,943 dated Sep. 2, 2016.

* cited by examiner

METHOD FOR MANUFACTURING LITHIUM ION SECONDARY BATTERY

CROSS-REFERENCE TO RELATED APPLICATIONS

This application is a national phase application of International Application No. PCT/JP2010/071852, filed Dec. 6, 2010, the content of which is incorporated herein by reference.

TECHNICAL FIELD

The present invention relates to a method for manufacturing a lithium-ion secondary battery.

Herein, in the present description, the term "secondary battery" denotes a repeatedly chargeable storage device in general. Further, in the present description, the term "lithium ion secondary battery" denotes a secondary battery in which lithium ions are used as electrolyte ions and charging and discharging is implemented by the transfer of electrons accompanying lithium ions between positive and negative electrodes.

BACKGROUND ART

As a method for manufacturing a lithium ion secondary battery, for example, Patent Literature 1 discloses the following: a slurry in which a conductive agent and a binding agent are dispersed in a solvent is coated onto a collector; then, the conductive agent is oriented by a magnetic field, and the solvent is removed by drying; as a result, a positive electrode is manufactured. In this literature, the conductive agent is a flake graphite powder or a vapor-grown carbon fiber. Patent Literature 1 has an object of providing a battery using a positive electrode capable of exhibiting a sufficient conductivity while minimizing the amount of the conductive agent to be added.

In addition, for example, the following facts are disclosed. A flake graphite powder has an anisotropy in resistance in each particle, and the electric resistivity in the in-plane direction of a (002) layer plane is about 1000 times the electric resistivity in the plane direction. When the layer plane of the flake graphite powder can be oriented perpendicularly with respect to the collector, the current collecting efficiency can be increased. This can reduce the amount of the conductive agent to be added. Further, a flat-panel-like flake graphite has a property of tending to be oriented in parallel with the plane of the collector when coated as a slurry on the collector. When immediately after the formation of a coating film from the slurry, a magnetic field is applied to the coating film, the flake graphite can be oriented. Also for a vapor-deposited carbon fiber, the resistance is lower in the direction of the fiber length. Similarly, by orienting the fiber length direction in the direction perpendicular to the plane of the collector, high current collecting capability can be exerted with a small amount of the conductive agent. When the conductive agent is oriented in a direction perpendicular to the collector, the resistance between the collector and the reaction layer is less likely to increase even when the cycle is repeated.

In Patent Literature 2, a substance obtained by making the flake natural graphite as described above spherical is used as a negative electrode active material. Then, to the graphite particles made spherical, a binding agent is added. A thickener is mixed therein, and the mixture is water dispersed, resulting in a paste form (slurry). Then, the slurry is coated to the negative electrode collector. Then, immediately thereafter, the negative electrode collector coated with the slurry of the negative electrode mixture is allowed to stand still or to pass in a magnetic field. As a result, the graphite particles are magnetically oriented. At this step, it is considered preferable that the magnetic lines of force be applied perpendicularly and evenly with respect to the plane of the electrode. Further, it is considered preferable that the electrode be dried immediately after the magnetic orientation. Further, as the binding agent, styrene-butadiene rubber (SBR) is disclosed.

Patent Literature 3 discloses that foreign matters deposited on a positive electrode plate or a negative electrode plate are continuously removed by a magnetic means.

CITATION LIST

Patent Literature

Patent Literature 1: Japanese Patent Application Laid-open No. 2006-127823
Patent Literature 2: Japanese Patent Application Laid-open No. 2006-83030
Patent Literature 3: Japanese Patent Application Laid-open No. 2008-152946

SUMMARY OF INVENTION

Technical Problem

Patent Literatures 1 and 2 both disclose that a slurry-like mixture including a graphite material and a binder is coated on a current collector foil, and the graphite material is oriented in a magnetic field, and is immediately dried.

However, findings by the present inventors revealed the following problems. Namely, when such a mixture is coated, and then, for example, is dried by exposure to a high-temperature atmosphere, convection occurs inside the mixture. The convection is caused in the following manner: drying proceeds from the mixture surface, so that the solvent is evaporated from the mixture surface; this causes the flow of the solvent from the inside of the mixture to the mixture surface. At this step, the particles in the mixture, particularly, the binding agent moves toward the surface of the mixture. Such convection is also referred to as migration. Such convection causes the binding agent to be present in such a manner as to gather near the surface of the mixture. Resultantly, the proportion of the binding agent is small in a portion of the mixture that is in the vicinity of the collecting foil. This results in a state in which the mixture layer after drying tends to peel from the collecting foil.

To prevent the defective condition due to such convection, for example, the following method appears possible: a binding agent is mixed in a large amount, thereby to ensure that a sufficient amount of binding agent remains in the portion of the mixture that is in the vicinity of the collecting foil even when convection occurs. However, with this method, it is highly likely that the binding agent may block the edge part of graphite that absorbs and releases lithium ions, deteriorating the function of graphite.

Another possible method is as follows: in order to make the convection less likely to occur, a pre-drying step for performing slow drying at a low temperature is provided at the initial stage of the drying step. Provision of the pre-drying step for performing slow drying at a low temperature at the initial stage of the drying step means that the drying step requires more time. This reduces the production efficiency. Accordingly, the drying facility is required to be increased in size, and the energy required for the drying increases. These and other points may cause an increase in facility cost or production cost. Thus, when the binding agent-mixed negative electrode mixture is coated on a metal foil, drying by exposure to a high-temperature drying atmosphere cannot be performed. As a result, the drying time cannot be shortened.

A method for manufacturing a lithium ion secondary battery proposed by the present inventors has a binder coating step, a mixture supplying step, a magnetic field applying step, and a convection generating step. Herein, the binder coating step is a step of coating a slurry-form binder containing a binding agent on a collector. The mixture supplying step is a step of supplying a negative electrode mixture containing graphite so as to be superposed on the slurry-form binder having been coated on the collector in the binder coating step. The magnetic field applying step is a step of applying a magnetic field having magnetic lines of force pointing in a direction orthogonal to a plane of the collector having been supplied with the negative electrode mixture, to the negative electrode mixture supplied to the collector in the mixture having been supplying step. The convection generating step is a step of generating convection in the negative electrode mixture by applying heat to the negative electrode mixture to which a magnetic field has been applied in the magnetic field applying step.

In accordance with such a method for manufacturing a lithium ion secondary battery, the step of coating a slurry-form binder to a collector (binder coating step) comes prior to the step in which the negative electrode mixture is supplied (mixture supplying step). Then, in the magnetic field applying step, to the negative electrode mixture coated on the collector, a magnetic field having magnetic lines of force pointing in the direction orthogonal to the collector is applied, so that the graphite can be oriented. Further, the convection generating step causes convection in the negative electrode mixture. When such convection occurs, part of the binding agent coated on the collector in the binder coating step moves toward the surface of the negative electrode mixture. Thus, the binding agent is dispersed in the negative electrode mixture. Further, although some of the binding agent coated on the collector in the binder coating step moves toward the surface of the negative electrode mixture, a large amount of the binding agent remains in the vicinity of the collector. For this reason, the negative electrode mixture layer after drying is less likely to peel from the metal foil. This contributes to the improvements of the performance stability and the cycle characteristics of the lithium ion secondary battery. Herein, one preferable form of the collector is metal foil. However, the collector is not necessarily limited to the metal foil. For example, the collector may be a conductivity-imparted resin. For the conductivity-imparted resin, it is possible to use, for example, a film material in which aluminum or copper is vapor-deposited on a polypropylene film.

In this case, the graphite may have a layered structure in which hexagonal platelet-shaped crystals are stacked one on another in such a manner as to form a plurality of layers. Further, the graphite may have a flat flake shape. The binding agent may be SBR.

Further, the viscosity (Adv) of the slurry-form binder to be coated in the binder coating step may satisfy, for example, 15 mPa·sec≤Adv≤10000 mPa·sec. More preferably, the viscosity (Adv) of the slurry-form binder may satisfy, for example, 50 mPa·sec≤Adv≤2000 mPa·sec. In this case, the viscosity (Adv) of the slurry-form binder is 50 mPa·sec to 2000 mPa·sec. For this reason, in the magnetic field applying step, the graphite contained in the negative electrode mixture tends to be properly oriented. Further, when the negative electrode mixture is supplied so as to be superposed on the slurry-form binder, the slurry-form binder layer tends to be kept. Herein, for the viscosity, the viscosity measurement may be desirably performed, for example, under an environment of ordinary temperature (e.g., 25° C.) and under the condition of 2 rpm by means of an E type viscometer. As one preferable embodiment, the viscosity (Adv) of the slurry-form binder may satisfy 50 mPa·sec≤Adv≤150 mPa·sec approximately. Further, as another preferable embodiment, the viscosity (Adv) of the slurry-form binder may satisfy 50 mPa·sec≤Adv≤100 mPa·sec approximately.

In this case, the solid content concentration (Ads) of the slurry-form binder to be coated in the binder coating step may desirably satisfy 5 wt %≤Ads≤20 wt %. As a result, the binding agent is contained in an appropriate proportion in the slurry-form binder, and hence the collector and the negative electrode mixture become less likely to peel from each other. Incidentally, the measurement of the solid content concentration may be desirably performed in the following manner: for example, a slurry or a paste that is a measuring object is placed in a container; and the solid content concentration is calculated based on the weight before drying and the weight after drying.

Further, the thickness (At) of the slurry-form binder to be coated in the binder coating step may desirably satisfy 1.0 μm≤At≤10.0 μm before drying the slurry-form binder. The negative electrode mixture is stacked on the slurry-form binder to be coated in the binder coating step drying is performed after achieving a liquid-phase double-layer state in so-called "wet on wet". In this case, by setting the thickness (At) of the slurry-form binder to be coated in the binder coating step at 1.0 μm≤At≤10.0 μm, it is possible to ensure an appropriate conductivity for the collector and the negative electrode mixture layer. Incidentally, Note that when the slurry-form binder is too thick, the conductivity of the collector and the negative electrode mixture layer may be inhibited.

In the binder coating step, the slurry-form binder may be desirably coated on the collector by gravure printing. With gravure printing, the slurry-form binder does not become too thick, and is easy to adjust to an appropriate amount.

The negative electrode mixture supplied in the mixture supplying step may not contain a binding agent. As a result, the amount of the binding agent to be used can be minimized by migration. Incidentally, the negative electrode mixture supplied in the mixture supplying step may contain a binding agent less susceptible to migration, such as PTFE.

Further, the viscosity (Bdv) of the negative electrode mixture supplied in the mixture supplying step desirably satisfies 500 mPa·sec≤Bdv≤5000 mPa·sec (E type viscometer, 25° C., at 2 rpm). As a result, in the magnetic field applying step, graphite can be appropriately oriented. The solid content concentration (Bds) of the negative electrode mixture supplied in the mixture supplying step may desirably satisfy 40 wt %≤Bds≤60 wt %. As a result, an appropriate amount of graphite can be contained in the negative electrode mixture layer.

It is also possible that the magnetic field applying step and the convection generating step may be performed at the same timing, so that a magnetic field having magnetic lines of force pointing in the direction orthogonal to the collector is applied to the negative electrode mixture having been coated on the collector in the mixture supplying step and that convection is generated by applying heat to the negative electrode mixture. Namely, in this case, while orienting graphite in the magnetic field applying step, heat is applied to the negative electrode mixture by the convection generating step. Accordingly, the orientation of the graphite oriented in the magnetic field applying step is easy to keep.

A lithium ion secondary battery manufacturing apparatus includes a traveling path having a guide allowing a collector to travel along a prescribed path on a supplying unit for supplying the collector to the traveling path, and a retrieving unit for retrieving the collector from the traveling path. In this case, in the traveling path, it is possible to provide a binder coating device, a mixture supplying device, a magnetic field applying device, and a convection generating device. Herein, the binder coating device is a device for coating a slurry-form binder to the collector. The mixture supplying device is a device for supplying a negative electrode mixture containing graphite so as to be superposed on the slurry-form binder coated on the collector, and may be desirably disposed closer to the retrieving unit than the binder coating device. The magnetic field applying device is a device for applying a magnetic field having magnetic lines of force pointing in the direction orthogonal to the collector, to the negative electrode mixture coated on the collector by the mixture supplying device. Such a magnetic field applying device may be desirably disposed closer to the retrieving unit than the mixture supplying device. The convection generating device is a device for generating convection in the negative electrode mixture by applying heat thereto, and may be disposed at the same position as that of the magnetic field applying device, or disposed closer to the retrieving unit than the magnetic field applying device.

Further, the lithium ion secondary battery which can be manufactured by such a method for manufacturing a lithium ion secondary battery includes a collector, and a negative electrode mixture layer adhering to the collector. The negative electrode mixture layer contains graphite and a binding agent. The weight ratio of the binding agent is smaller in a portion of the negative electrode mixture layer from a level at half a thickness of the negative electrode mixture layer to a surface of the negative electrode mixture layer than in a portion of the negative electrode mixture layer from a surface of the collector to the level at half the thickness of the negative electrode mixture layer. In addition, the graphite is oriented such that an interlayer plane of layers of hexagonal platelet-shaped crystal is orthogonal to the surface of the collector. With such a lithium ion secondary battery, the graphite of the negative electrode mixture layer is oriented with the edge part pointing to the surface of the negative electrode mixture layer, and hence a high output and a low resistance can be exerted. Further, for the lithium ion secondary battery, the negative electrode mixture layer is less likely to peel off, so that the performance stability and the cycle characteristics are good.

DESCRIPTION OF EMBODIMENTS

Figure 1:
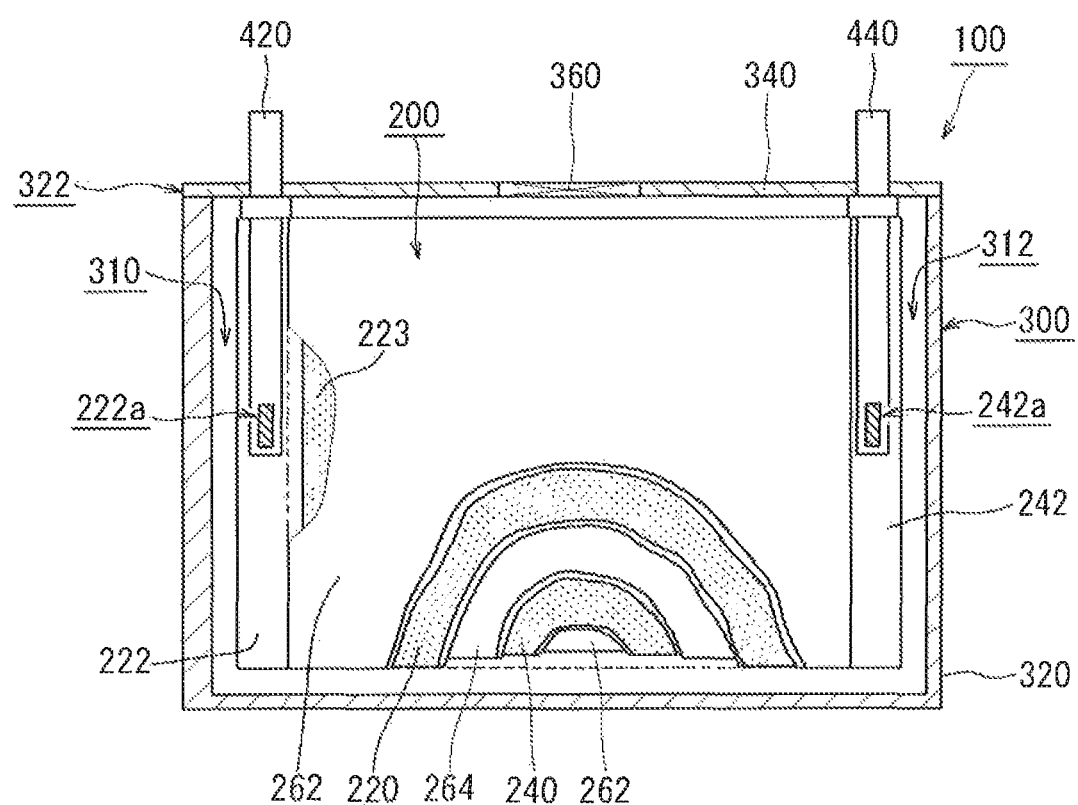
FIG. 1 is a view showing one example of the structure of a lithium ion secondary battery.

Hereinbelow, a method for manufacturing a lithium ion secondary battery in accordance with one embodiment of the present invention will be described with reference to the accompanying drawings. First, an example of the structure of the lithium ion secondary battery will be described. Then, a method for manufacturing the lithium ion secondary battery will be described. Herein, like parts and components functioning in a like manner are denoted by like reference numerals. Further, the drawings are illustrated schematically and do not necessarily reflect real objects.

Figure 2:
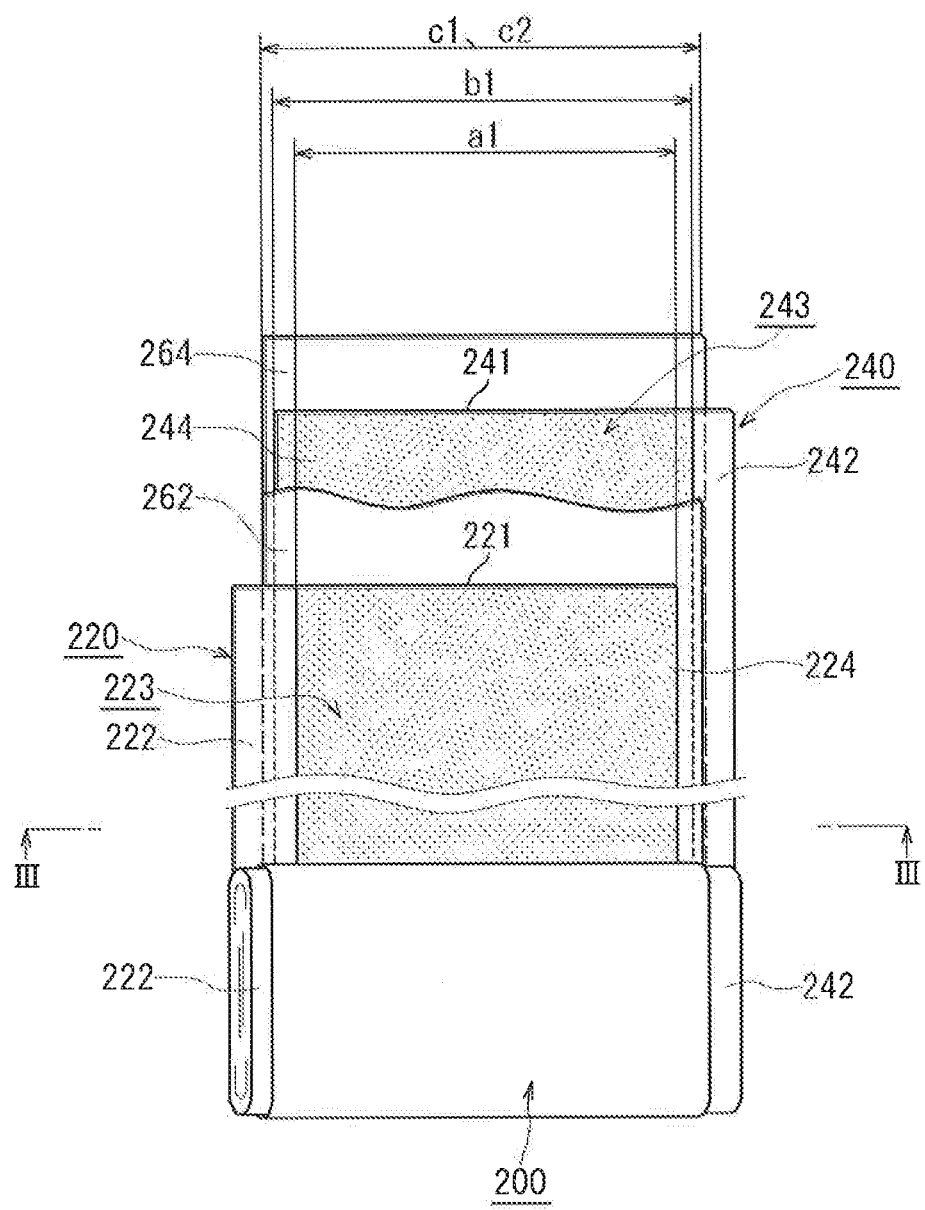
FIG. 2 is a view showing a wound electrode body of the lithium ion secondary battery.
Figure 3:
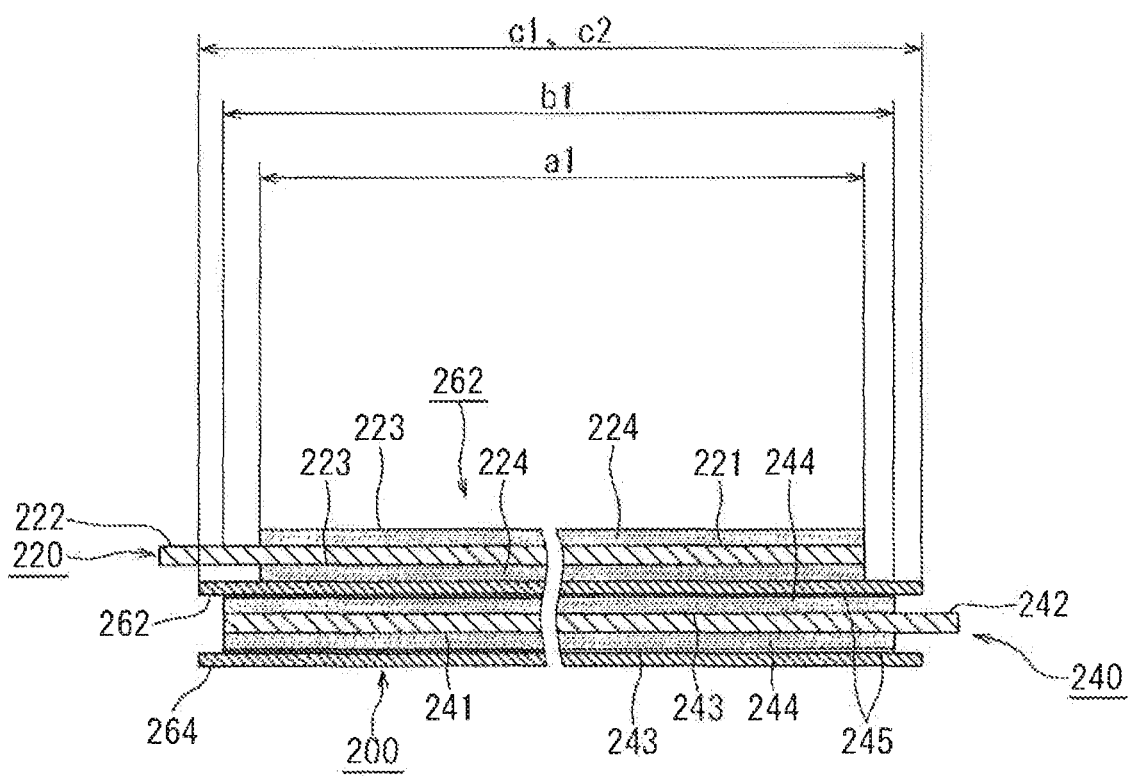
FIG. 3 is a cross-sectional view along line III-III in FIG. 2.

FIG. 1 shows a lithium ion secondary battery 100. The lithium ion secondary battery 100 includes, as shown in FIG. 1, a wound electrode body 200 and a battery case 300. FIG. 2 is a view showing the wound electrode body 200. FIG. 3 shows a cross section along line III-III in FIG. 2.

The wound electrode body 200 has, as shown in FIG. 2, a positive electrode sheet 220, a negative electrode sheet 240, and separators 262 and 264. The positive electrode sheet 220, the negative electrode sheet 240, and the separators 262 and 264 are strip-shaped sheet materials.

<Positive Electrode Sheet 220>

The positive electrode sheet 220 has a strip-shaped positive electrode collector 221 (positive electrode core material) as shown in FIG. 2. For the positive electrode collector 221, it is possible to use a metal foil suitable for the positive electrode. For the positive electrode collector 221, a strip-shaped aluminum foil having a prescribed width is used. The positive electrode sheet 220 has an uncoated part 222 and a positive electrode mixture layer 223. The uncoated part 222 is set along the edge on one side along the width direction of the positive electrode collector 221. The positive electrode mixture layer 223 is a layer having a positive electrode mixture 224 containing a positive electrode active material, coated on the collector. The positive electrode mixture 224 is coated on both sides of the positive collector 221 except for the uncoated part 222 set in the positive electrode collector 221.

<Positive Electrode Mixture Layer 223, Positive Electrode Active Material 610>

Figure 4:
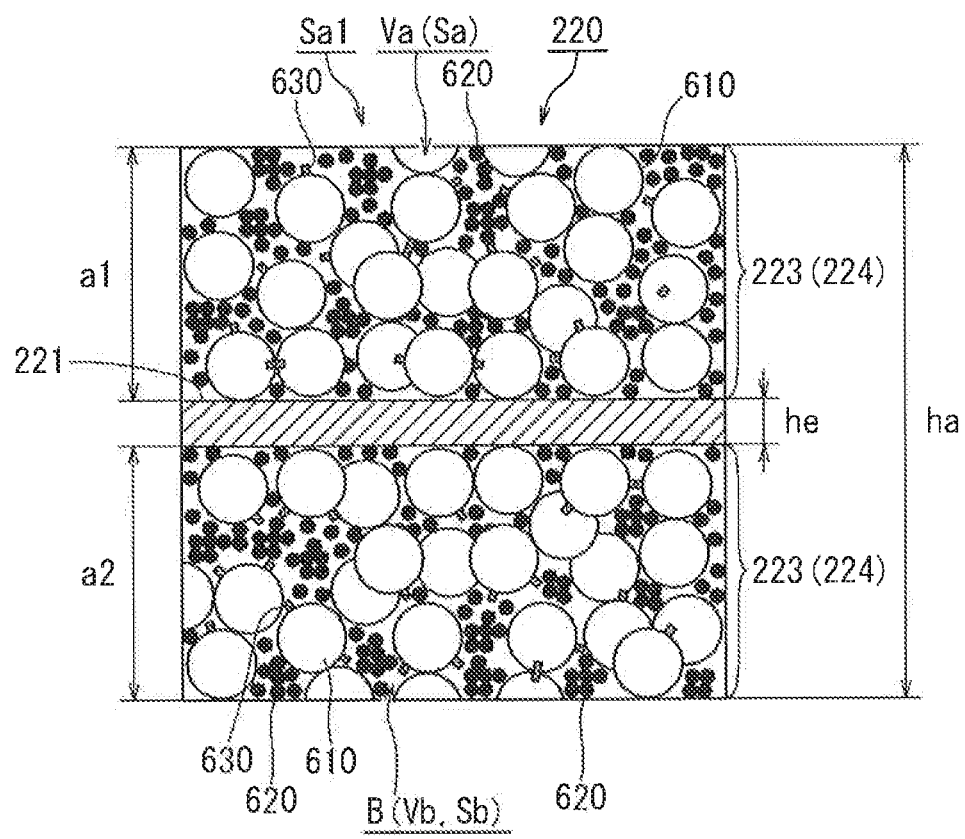
FIG. 4 is a cross-sectional view showing the structure of a positive electrode mixture layer.

Herein, FIG. 4 is a cross-sectional view of the positive electrode sheet 220 of the lithium ion secondary battery 100. In FIG. 4, a positive electrode active material 610 and a conductive material 620 in the positive electrode mixture layer 223 are schematically shown on an enlarged scale to illustrate the structure of the positive electrode mixture layer 223 clearly.

The positive electrode mixture layer 223 contains, as shown in FIG. 4, the positive electrode active material 610, the conductive material 620, and the binder 630. For the positive electrode active material 610, it is possible to use a substance that is commonly used as the positive electrode active material of lithium ion secondary batteries. Examples of the positive electrode active material 610 include lithium transition metal oxides such as $LiNiCoMnO_2$ (lithium nickel cobalt manganese composite oxide), $LiNiO_2$ (lithium nickel oxide), $LiCoO_2$ (lithium cobalt oxide), $LiMn_2O_4$ (lithium manganese oxide), and $LiFePO_4$ (lithium iron phosphate). Herein, $LiMn_2O_4$ has, for example, a spinel structure. $LiNiO_2$ and $LiCoO_2$ each have a layered rocksalt structure. Further, $LiFePO_4$ has, for example, an olivine structure. $LiFePO_4$ of the olivine structure includes, for example, particles of nanometer order. The $LiFePO_4$ of the olivine structure may be further coated with a carbon film.

<Conductive Material 620>

Examples of the conductive material 620 include carbon materials such as carbon powder and carbon fiber. One selected from such conductive materials may be used alone, or two or more thereof may be used in combination. As the carbon powders, it is possible to use various carbon blacks (e.g., acetylene black, oil furnace black, graphitized carbon black, carbon black, graphite, Ketjen black) and graphite powder.

<Binder 630>

The binder 630 binds particles of the positive electrode active material 610 and the conductive material 620 to each other, and binds these particles with the positive electrode collector 221. As the binder 630, it is possible to use a polymer dissolvable or dispersible in a solvent to be used. For example, in a positive electrode mixture composition using an aqueous solvent, it is possible to use water-soluble or water-dispersible polymers, including: cellulose-based polymers, such as carboxymethyl cellulose (CMC) and hydroxypropyl methyl cellulose (HPMC); polyvinyl alcohol (PVA); fluororesins, such as polytetrafluoroethylene (PTFE) and tetrafluoroethylene-hexafluoropropylene copolymer (FEP); vinyl acetate copolymers; and rubbers, such as styrene butadiene rubber (SBR) and acrylic acid-modified SBR resin (SBR type latex). In the positive electrode mixture composition using a non-aqueous solvent, it is possible to adopt polymers such as polyvinylidene difluoride (PVDF), polyvinylidene chloride (PVDC), and polyacrylonitrile (PAN). The polymer materials shown above may be used for the purpose of exerting the functions as other additives such as a thickener of the composition, in addition to the function as the binder.

<Thickener, Solvent>

The positive electrode mixture layer 223 is formed in the following manner: for example, the positive electrode active material 610 and the conductive material 620 are mixed in a paste form (slurry form) to form the positive electrode mixture 224; thus, the positive electrode mixture 224 is coated on the positive electrode collector 221, followed by drying and rolling. At this step, as the solvent, it is possible to use either of an aqueous solvent and non-aqueous solvent. Preferable examples of the non-aqueous solvent may include N-methyl-2-pyrrolidone (NMP).

The mass ratio of the positive electrode active material based on the total amount of the positive electrode mixture is preferably about 50 wt % or more (typically 50 wt % to 95 wt %), and generally more preferably about 70 wt % to 95 wt % (e.g., 75 wt % to 90 wt %). Further, the ratio of the conductive material based on the total amount of the positive electrode mixture can be set at, for example, about 2 wt % to 20 wt %, and is generally preferably set at about 2 wt % to 15 wt %. In the composition using the binder, the ratio of the binder based on the total amount of the positive electrode mixture can be set at, for example, about 1 wt % to 10 wt %, and generally preferably at about 2 wt % to 5 wt %.

<Negative Electrode Sheet 240>

The negative electrode sheet 240 has, as shown in FIG. 2, a strip-shaped negative electrode collector 241 (negative electrode core material). For the negative electrode collector 241, it is possible to use a metal foil suitable for the negative electrode. In this embodiment, for the negative electrode collector 241, a strip-shaped copper foil having a prescribed width is used. Further, the negative electrode sheet 240 has an uncoated part 242 and a negative electrode mixture layer 243. The uncoated part 242 is set along the edge on one side along the width direction of the negative electrode collector 241. The negative electrode mixture layer 243 is a layer having a negative electrode mixture 244 containing a negative electrode active material, coated on the collector. The negative electrode mixture 244 is coated on both sides of the negative electrode collector 241 except for the uncoated part 242 set in the negative electrode collector 241.

<Negative Electrode Mixture 244>

Figure 5:
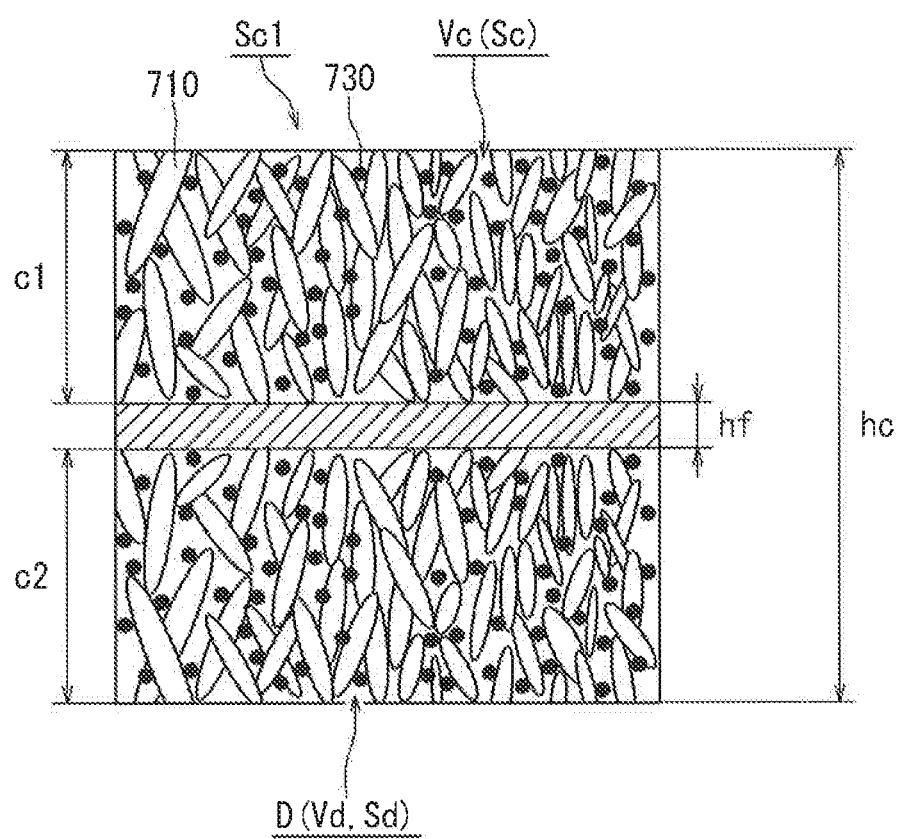
FIG. 5 is a cross-sectional view showing the structure of a negative electrode mixture layer.

FIG. 5 is a cross-sectional view of the negative electrode sheet 240 of the lithium ion secondary battery 100. Further, in FIG. 5, a negative electrode active material 710 in the negative electrode mixture layer 243 is shown on an enlarged scale, so that the structure of the negative electrode mixture layer 243 becomes definite. Herein, there is shown the case where so-called flake graphite is used for the negative electrode active material 710. However, the negative electrode active material 710 is not limited to this example. The negative electrode mixture layer 243 contains, as shown in FIG. 5, the negative electrode active material 710, the thickener (not shown), a binder 730, and the like.

<Negative Electrode Active Material 710>

Examples of the negative electrode active material include graphites (carbon type materials) such as natural graphite, artificial graphite, and amorphous carbon of natural carbon or artificial carbon. The negative electrode active material itself has conductivity. Further, in this example, as shown in FIG. 3, on the surface of the negative electrode mixture layer 243, further, a heat-resistant layer (HRL) 245 is formed. The heat-resistant layer 245 is mainly formed of a metal oxide (e.g., alumina). In the lithium ion secondary battery 100, the heat-resistant layer 245 is formed on the surface of each negative electrode mixture layer 243. Although not shown, the heat-resistant layers may be formed on the surfaces of the separators 262 and 264.

<Negative Electrode Active Material>

Further, as the negative electrode active material, it is possible to use one, or two or more of the materials conventionally used for the lithium ion secondary battery without particular restriction. For the negative electrode active material, for example, mention may be made of particulate carbon materials (carbon particles) including a graphite structure (layered structure) in at least a part thereof. More specifically, it is possible to use so-called graphitic (graphite), non-graphitizing carbon (hard carbon), graphitizing carbon (soft carbon), and carbon materials of combination thereof. For example, there can be used graphite particles such as natural graphite. For the negative electrode active material, it is possible to use a material obtained by subjecting the natural graphite surface to amorphous carbon coat.

Although not particularly restricted, the ratio of the negative electrode active material based on the whole negative electrode mixture can be set at about 80 wt % or more (e.g., 80 wt % to 99 wt %). Further, the ratio of the negative electrode active material based on the total amount of the negative electrode mixture is preferably about 90 wt % or more (e.g., 90 wt % to 99 wt %, and more preferably 95 wt % to 99 wt %). The ratio of the binder 730 based on the total amount of the negative electrode mixture can be set at, for example, about 0.5 wt % to 10 wt %, and can be generally preferably set at about 0.5 wt % to 5 wt %.

<Separators 262 and 264>

The separators 262 and 264 are members for separating the positive electrode sheet 220 and the negative electrode sheet 240. In this example, the separators 262 and 264 are formed of prescribed-width strip-shaped sheet materials having a plurality of micropores. Examples of the separators 262 and 264 include a separator of a monolayer structure and a separator of a multilayer structure formed of a porous polyolefin type resin. In this example, as shown in FIGS. 2 and 3, the width b1 of the negative electrode mixture layer 243 is a little larger than the width a1 of the positive electrode mixture layer 223. Further, the widths c1 and c2 of the separators 262 and 264 are a little larger than the width b1 of the negative electrode mixture layer 243 (c1, c2>b1>a1).

<Wound Electrode Body 200>

The positive electrode sheet 220 and the negative electrode sheet 240 of the wound electrode body 200 are stacked one on another via the separators 262 and 264, and are wound.

In this example, the positive electrode sheet 220, the negative electrode sheet 240, the separators 262 and 264 are stacked, as shown in FIG. 2, in the order of the positive electrode sheet 220, the separator 262, the negative electrode sheet 240, and the separator 264 with the length directions aligned parallel to one another. At this step, the separators 262 and 264 are stacked on the positive electrode mixture layer 223 and the negative electrode mixture layer 243, respectively. The width of the negative electrode mixture layer 243 is a little larger than that of the positive electrode mixture layer 223. The negative electrode mixture layer 243 is stacked in such a manner as to cover the positive electrode mixture layer 223. As a result, lithium ions (Li) come and go between the positive electrode mixture layer 223 and the negative electrode mixture layer 243 during charging and discharging with more reliability.

Further, the uncoated part 222 of the positive electrode sheet 220 and the uncoated part 242 of the negative electrode sheet 240 are stacked in such a manner as to protrude to the opposite sides to each other in the width direction of the separators 262 and 264. The stacked sheet materials (e.g., the positive electrode sheet 220) are wound around a winding shaft set in the width direction.

Such a wound electrode body 200 is configured such that the positive electrode sheet 220, the negative electrode sheet 240, and the separators 262 and 264 are wound while being stacked in a prescribed order. In this step, respective sheets are stacked one on another while controlling the positions of respective sheets by means of a position adjusting mechanism such as EPC (edge position control). This results in a state in which the separators 262 and 264 are interposed therein. Thus, the negative electrode mixture layer 243 is stacked in such a manner as to cover the positive electrode mixture layer 223.

<Battery Case 300>

In this example, the battery case 300 is, as shown in FIG. 1, a so-called rectangle-type battery case, and includes a container main body 320 and a lid 340. The container main body 320 is a flat box-type container having a bottomed rectangular tube form, and opened at one side surface (top surface). The lid 340 is a member mounted at the opening (the opening of the top surface) of the container main body 320, and blocking the opening.

An on-vehicle secondary battery is desired to be improved in weight energy efficiency (capacitance of battery per unit weight) for fuel economy enhancement. For this reason, for the container main body 320 and the lid 340 forming the battery case 300, light metals such as aluminum and aluminum alloy (in this example, aluminum) are desirably adopted. This can improve the weight energy efficiency.

The battery case 300 has a flat rectangular internal space as the space for accommodating the wound electrode body 200. Further, as shown in FIG. 1, the flat internal space of the battery case 300 is a little wider in width than the wound electrode body 200. In this embodiment, the wound electrode body 200 is accommodated in the internal space of the battery case 300. The wound electrode body 200 is accommodated in the battery case 300, in a form deformed flat in one direction orthogonal to the winding shaft, as shown in FIG. 1.

In this embodiment, the battery case 300 includes a bottomed rectangular container main body 320, and a lid 340 for blocking the opening of the container main body 320. Herein, the container main body 320 can be formed by, for example, deep drawing forming or impact forming. Impact forming is a kind of cold forging, and is also referred to as impact extrusion, or impact press.

At the lid 340 of the battery case 300, the electrode terminals 420 and 440 are mounted. The electrode terminals 420 and 440 penetrate through the battery case 300 (lid 340) to protrude to the outside of the battery case 300. Further, a safety valve 360 is disposed in the lid 340.

In this example, the wound electrode body 200 is mounted to the electrode terminals 420 and 440 mounted at the battery case 300 (in this example, the lid 340). The wound electrode body 200 is accommodated in the battery case 300, in a form deformed flat in one direction orthogonal to the winding shaft. In the wound electrode body 200, the uncoated part 222 of the positive electrode sheet 220 and the uncoated part 242 of the negative electrode sheet 240 protrude to the opposite sides to each other in the width direction of the separators 262 and 264. Out of these, one electrode terminal 420 is fixed at the uncoated part 222 of the positive electrode collector 221. The other electrode terminal 440 is fixed at the uncoated part 242 of the negative electrode collector 241.

Figure 6:
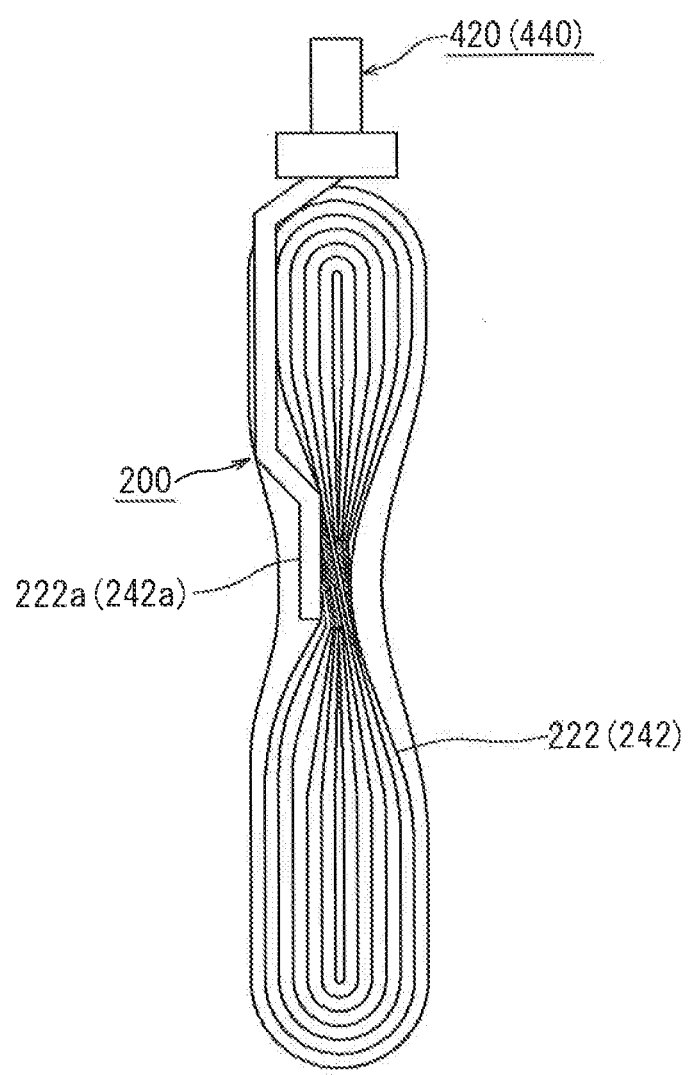
FIG. 6 is a side view showing a welded site between an uncoated part of a wound electrode body and an electrode terminal.

Further, in this example, as shown in FIG. 1, the electrode terminals 420 and 440 of the lid 340 extend to the intermediate portions 222a and 242a of the uncoated part 222 and the uncoated part 242 of the wound electrode body 200. The tip parts of the electrode terminals 420 and 440 are welded to respective intermediate portions of the uncoated parts 222 and 242, respectively. FIG. 6 is a side view showing the welded part between the uncoated part 222 or 242 of the wound electrode body 200 and the electrode terminal 420 or 440.

On both sides of the separators 262 and 264, the uncoated part 222 of the positive electrode collector 221, and the uncoated part 242 of the negative electrode collector 241 are exposed in a spiral. As shown in FIG. 6, in this embodiment, the uncoated parts 222 and 242 are respectively gathered at the intermediate portions thereof, and are welded to the tip parts of the electrode terminals 420 and 440, respectively. At this step, for welding between the electrode terminal 420 and the positive electrode collector 221, for example, ultrasonic welding is used because of the difference in material therebetween. For welding between the electrode terminal 440 and the negative electrode collector 241, for example, resistance welding is used.

Thus, the wound electrode body 200 is mounted in a state bent in a flat shape to the electrode terminals 420 and 440 fixed to the lid 340. Such a wound electrode body 200 is accommodated in the flat internal space of the container main body 320. The container main body 320 is closed by the lid 340 after the accommodation of the wound electrode body 200 therein. The juncture 322 between the lid 340 and the container main body 320 (see FIG. 1) is sealed by welding by, for example, laser welding. Thus, in this example, the wound electrode body 200 is positioned in the battery case 300 by the electrode terminals 420 and 440 fixed to the lid 340 (battery case 300).

<Electrolyte>

Then, an electrolyte is injected into the battery case 300 from a liquid injecting hole disposed in the lid 340. For the electrolyte, in this example, there is used an electrolyte obtained by allowing a mixed solvent of ethylene carbonate and diethyl carbonate (e.g., mixed solvent in a volume ratio of about 1:1) to contain $LiPF_6$ in a concentration of about 1 mol/liter. Then, a sealing cap made of a metal is attached (e.g., welded) to the liquid injecting hole to seal the battery case 300. As the electrolyte, it is possible to use a non-aqueous electrolyte conventionally used for a lithium ion secondary battery.

<Gas Release Path>

Further, in this example, the flat internal space of the battery case 300 is a little larger than the wound electrode body 200 deformed to a flat shape. On both the sides of the wound electrode body 200, gaps 310 and 312 are provided between the wound electrode body 200 and the battery case 300. The gaps 310 and 312 serve as gas release paths.

The lithium ion secondary battery 100 of such a configuration increases in temperature when overcharging occurs. When the temperature of the lithium ion secondary battery 100 increases, the electrolyte is decomposed to generate gases. The generated gases are smoothly evacuated to the outside through the gaps 310 and 312 between the wound electrode body 200 and the battery case 300 on both sides of the wound electrode body 200, and the safety valve 360. With such a lithium ion secondary battery 100, the positive electrode collector 221 and the negative electrode collector 241 are electrically connected to an external device through the electrode terminals 420 and 440 penetrating through the battery case 300.

<Positive Electrode Mixture Layer 223, Negative Electrode Mixture Layer 243>

As shown in FIG. 4, in this embodiment, both the surfaces of the positive electrode collector 221 are coated with the positive electrode mixture 224, respectively. The layer of such a positive electrode mixture 224 (positive electrode mixture layer 223) includes a positive electrode material 610 and a conductive material 620. As shown in FIG. 5, both the surfaces of the negative electrode collector 241 are coated with the negative electrode mixture 244, respectively. The layer of such a negative electrode mixture 244 (negative electrode mixture layer 243) includes a negative electrode active material 710.

<Pore>

Herein, the positive electrode mixture layer 223 has micro-gaps which should be also referred to as cavities, for example, between particles of the positive electrode active material 610 and the conductive material 620, and the like. An electrolyte (not shown) can be penetrated into the micro-gaps of such a positive electrode mixture layer 223. Further, the negative electrode mixture layer 243 has micro-gaps which should be also referred to as cavities, for example, between particles of the negative electrode active material 710, and the like. An electrolyte (not shown) can be penetrated into the micro-gaps of such a negative electrode mixture layer 243. Herein, such gaps (cavities) are appropriately referred to as "pores".

Below, a description will be given to the operation of the lithium ion secondary battery 100 during charging and during discharging.

<Operation During Charging>

Figure 7:
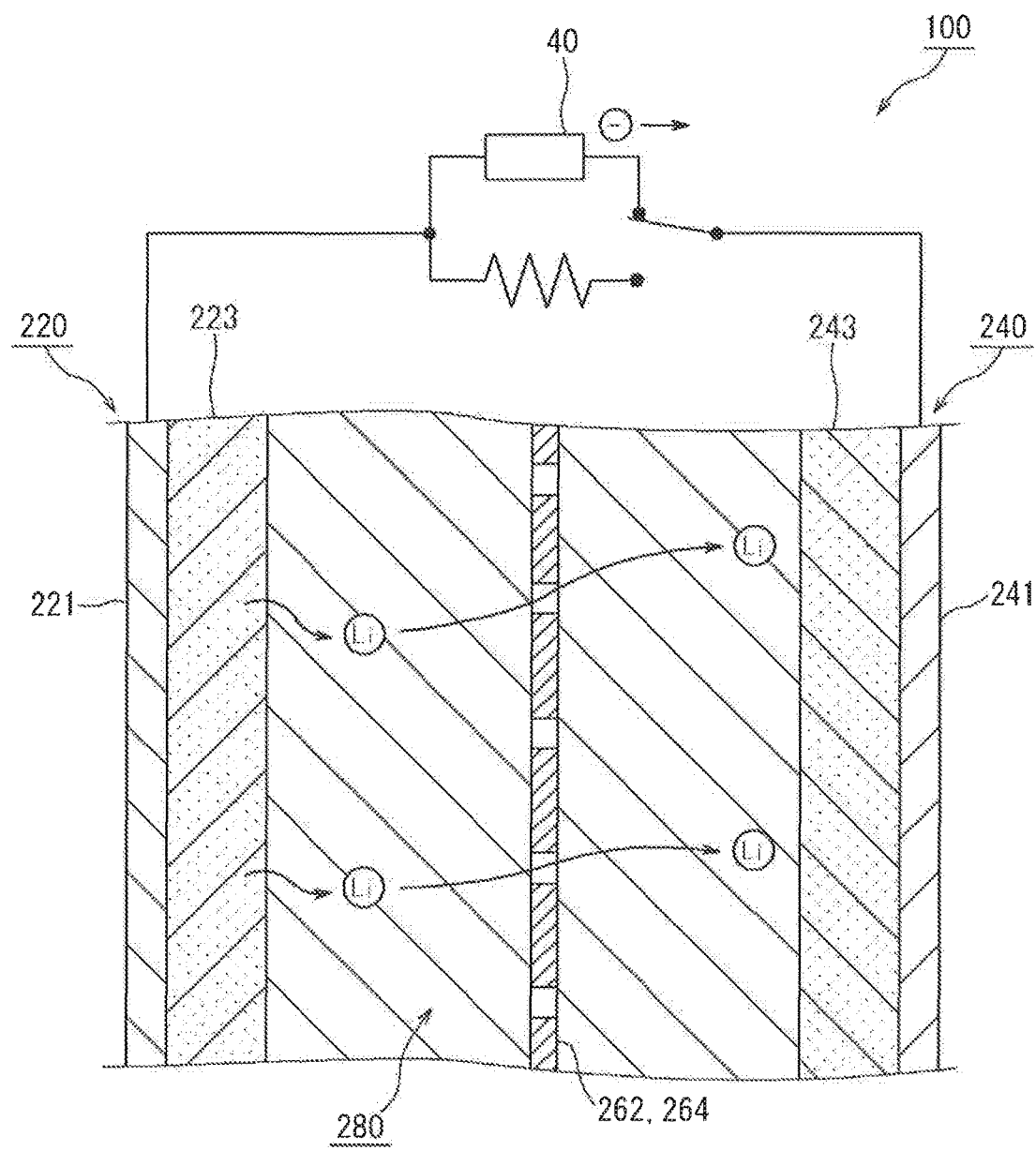
FIG. 7 is a view schematically showing a state during charging of the lithium ion secondary battery.

FIG. 7 schematically shows the state during charging of such a lithium ion secondary battery 100. During charging, as shown in FIG. 7, the electrode terminals 420 and 440 of the lithium ion secondary battery 100 (see FIG. 1) are connected to a charger 40. By the action of the charger 40, during charging, lithium ions (Li) are released to an electrolyte 280 from the positive electrode active material 610 in the positive electrode mixture layer 223 (see FIG. 4). Electrons are released from the positive electrode active material 610 (see FIG. 4). The released electrodes are, as shown in FIG. 7, fed to the positive electrode collector 221 through the conductive material 620, and further fed to the negative electrode through the charger 40. In the negative electrode, electrons are accumulated, and lithium ions (Li) in the electrolyte 280 are absorbed into the negative electrode active material 710 in the negative electrode mixture layer 243 (see FIG. 5), and are stored.

<Operation During Discharging>

Figure 8:
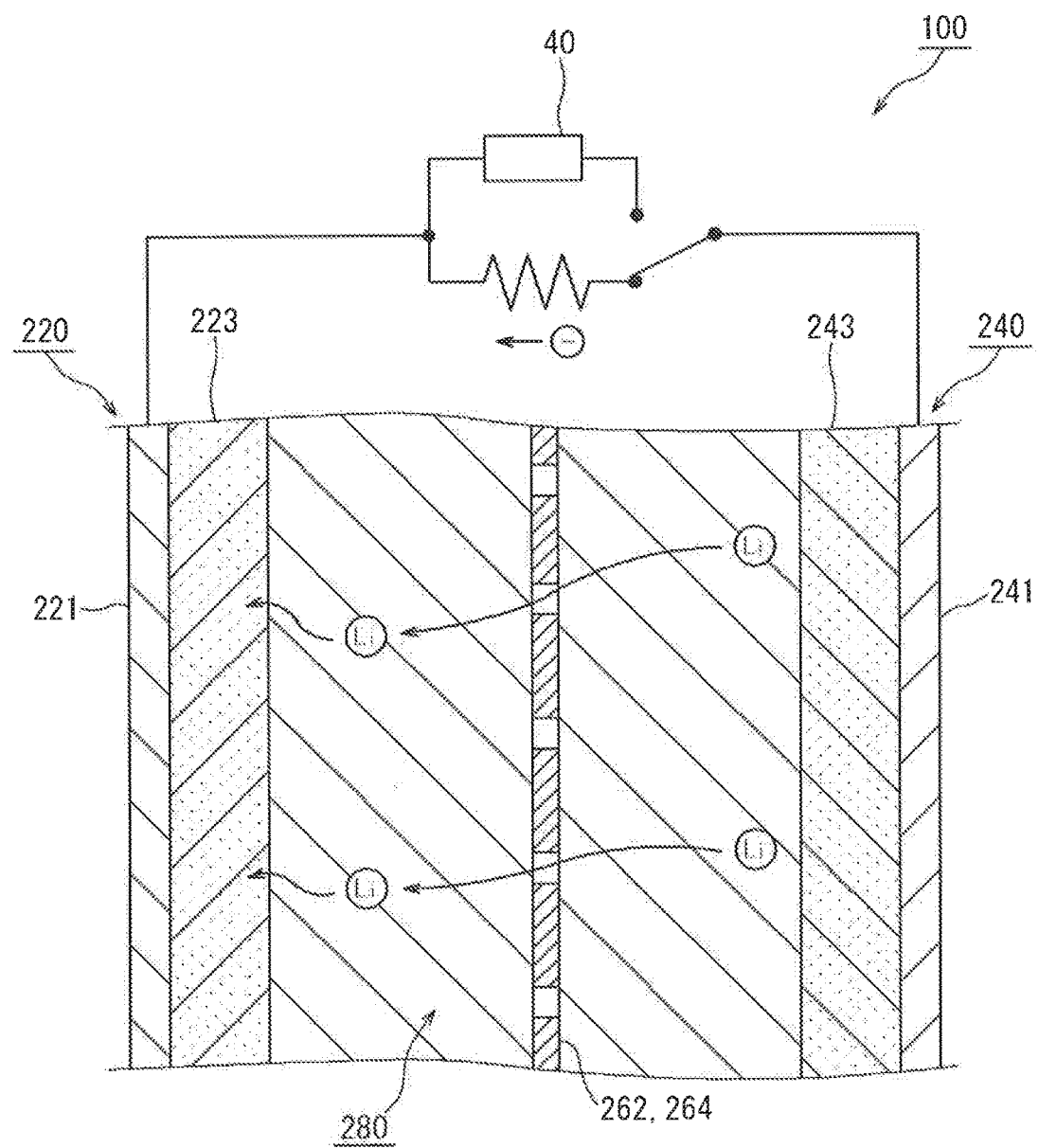
FIG. 8 is a view schematically showing a state during discharging of the lithium ion secondary battery.

FIG. 8 schematically shows the state during discharging of such a lithium ion secondary battery 100. During discharging, as shown in FIG. 8, electrons are fed from the negative electrode to the positive electrode, and the lithium ions (Li ions) stored in the negative electrode mixture layer 243 are released to the electrolyte 280. In the positive electrode, the lithium ions (Li) in the electrolyte 280 are captured into the positive electrode active material 610 in the positive electrode mixture layer 223.

Thus, during charging and discharging of the lithium ion secondary battery 100, lithium ions (Li) travel between the positive electrode mixture layer 223 and the negative electrode mixture layer 243 via the electrolyte 280. For this reason, required pores into which the electrolyte 280 can penetrate and lithium ions can diffuse smoothly are desirably present around the positive electrode active material 610 (see FIG. 4), and around the negative electrode material 710 (see FIG. 5) in the positive electrode mixture layer 223. With such a configuration, sufficient lithium ions may be present around the positive electrode active material 610 and the negative electrode active material 710. Accordingly, the come and go of lithium ions (Li) becomes smooth between the electrolyte 280 and the positive electrode active material 610, and between the electrolyte 280 and the negative electrode active material 710.

During charging, electrons are fed from the positive electrode active material 610 through the conductive material 620 to the positive electrode collector 221. In contrast, during discharging, electrons are returned from the positive electrode collector 221 through the conductive material 620 to the positive electrode active material 610. The positive electrode active material 610 is formed of a lithium transition metal oxide, and is poor in conductivity. For this reason, the transfer of electrons between the positive electrode active material 610 and the positive electrode collector 221 is performed mainly via the conductive material 620.

Thus, it is considered as follows: during charging, more smooth transfer of lithium ions (Li) and transfer of electrons enable more efficient and rapid charging. It is considered as follows: during discharging, more smooth transfer of lithium ions (Li) and transfer of electrons result in a reduction of the resistance of the battery, and an increase in discharging amount; for this reason, the output of the battery is improved.

<Other Battery Form>

The foregoing description shows one example of the lithium ion secondary battery. The lithium ion secondary battery is not limited to the foregoing form. Further, similarly, the electrode sheet including the collector coated with the electrode mixture is also used for other various battery forms. For example, as the other battery forms, there are known a cylindrical type battery, a laminate type battery, and the like. The cylindrical type battery is a battery in which a wound electrode body is accommodated in a cylindrical type battery case. The laminate type battery is a battery in which a positive electrode sheet and a negative electrode sheet are stacked with a separator interposed therebetween.

Figure 9:
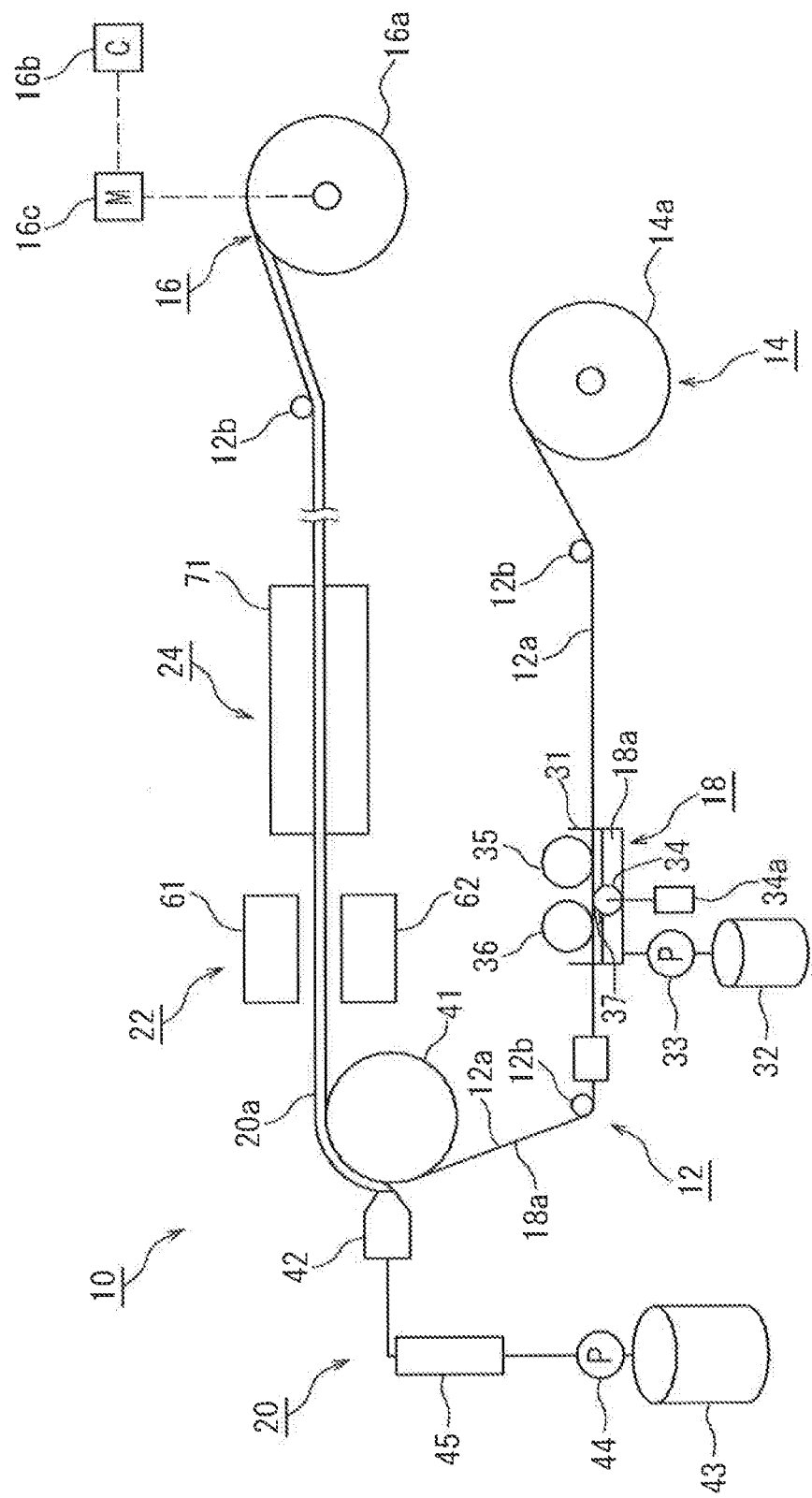
FIG. 9 is a view showing a apparatus for manufacturing a lithium ion secondary battery in accordance with one embodiment of the present invention.

Below, a description will be given to a method for manufacturing a lithium ion secondary battery in accordance with one embodiment of the present invention. FIG. 9 is a view showing a manufacturing apparatus embodying such a method for manufacturing a lithium ion secondary battery.

The method for manufacturing a lithium ion secondary battery includes a binder coating step (18), a mixture supplying step (20), a magnetic field applying step (22), and a convection generating step (24).

In this embodiment, the binder coating step (18) is a step of coating a slurry-form binder 18a on a collector (e.g., metal foil 12a). The mixture supplying step (20) is a step of supplying a negative electrode mixture containing graphite so as to be superposed on the slurry form binder 18a coated on the metal foil 12a in the binder coating step (18). The magnetic field applying step (22) is a step of applying a magnetic field having magnetic lines of force pointing in a direction orthogonal to the metal foil 12a to the negative electrode mixture 20a having been coated on the metal foil 12a in the mixture supplying step (20). The convection generating step (24) is a step of generating convection in the negative electrode mixture 20a by applying heat to the negative electrode mixture 20a to which a magnetic field has been applied in the magnetic field applying step (22).

A manufacturing apparatus 10 of a lithium ion secondary battery embodying such a method for manufacturing a lithium ion secondary battery includes, in the example shown in FIG. 9, a traveling path 12, a supplying unit 14, a retrieving unit 16, a binder coating device 18, a mixture supplying device 20, a magnetic field applying device 22, and a convection generating device 24.

The traveling path 12 includes guides 12b allowing the metal foil 12a (e.g., copper foil), which is a material for the negative electrode collector 241 herein (see FIG. 2), along a preset prescribed path. In this embodiment, the guide 12b is formed of a plurality of guide rollers disposed along the traveling path 12 of the preset metal foil 12a. Although not shown, in the traveling path 12, a tension-adjusting mechanism (e.g., dancer roller) may be appropriately disposed, if required, so that a proper tension acts on the metal foil 12a. Further, in the traveling path 12, it is possible to provide, if required, a position adjusting mechanism for adjusting the position in the width direction of the metal foil 12a. For the position adjusting mechanism, it is possible to adopt a position adjusting mechanism such as a so-called EPC (edge position control) of a combination of an edge detecting device (edge sensor) and a position correction mechanism (position controller).

<Supplying Unit 14>

The supplying unit 14 is a unit for supplying the metal foil 12a to the traveling path 12. In this embodiment, the supplying unit 14 is, as shown in FIG. 9, disposed at the beginning end of the traveling path 12. The metal foil 12a previously wound on a winding core 14a is disposed at the supplying unit 14. Thus, a proper amount of the metal foil 12a is appropriately supplied from the supplying unit 14 to the traveling path 12.

<Retrieving Unit 16>

The retrieving unit 16 is a unit for retrieving the metal foil 12a from the traveling path 12. In this embodiment, the retrieving unit 16 is disposed at the terminal end of the traveling path 12. The retrieving unit 16 is formed of a winding device for winding the metal foil 12a subjected to a prescribed treatment on a winding core 16a at the traveling path 12. Such a device includes, for example, a motor 16c driven in accordance with a prescribed program set in a control unit 16b. The winding core 16a is operated by the motor 16c, and winds the metal foil 12a.

<Binder Coating Device 18 (Binder Coating Step)>

The binder coating device 18 is disposed at the traveling path 12, and is a device for coating the slurry-form binder 18a on the metal foil 12a. In this embodiment, as the binder coating devices 18, various devices can be adopted so long as they are devices capable of coating a binder to the metal foil 12a in a preset weight per unit area. In this embodiment, the weight per unit area of the binder before drying is, for example, about 0.020 mg/cm$^2$ to 0.030 mg/cm$^2$. For this reason, there is adopted a device for coating a binder onto the metal foil 12a by printing. As such a device, for example, it is possible to adopt a device having the same structure as that of a gravure printer.

In the example shown in FIG. 9, a gravure printer is used as the binder coating device 18. The binder coating device 18 includes a binder accommodating container 31, a tank 32, a pump 33, a gravure roll 34, a transport rolls 35 and 36, and a blade 37. The binder accommodating container 31 is a container to be filled with a required amount of the slurry-form binder 18a. The tank 32 is a tank in which the slurry-form binder 18a is stored. The pump 33 is a device for appropriately supplying the slurry-form binder 18a from the tank 32 into the binder accommodating container 31. The gravure roll 34 is a roller member for printing the slurry-form binder 18a onto the metal foil 12a. In this embodiment, the gravure roll 34 is disposed in such a manner as to be immersed at a part thereof in the binder accommodating container 31, and to be pressed against the metal foil 12a traveling along the traveling path 12 at another part thereof. In this embodiment, the gravure roll 34 has a so-called diagonal sculpture pattern, and has a diagonal sculpture formed on the outer peripheral surface. The transport rolls 35 and 36 press the metal foil 12a against the gravure roll 34, and rotate at a prescribed rotational speed, thereby to feed the metal foil 12a to the gravure roll 34 at a prescribed speed.

In this embodiment, the gravure roll 34 rotates in the opposite direction to the traveling direction of the metal foil 12a by the motor 34a. The binder 18a of the binder accommodating container 31 adheres to the gravure roll 34. The binder 18a adhering to the gravure roll 34 is scraped off to a prescribed amount by the blade 37 so that the amount adhering to the gravure roll 34 is adjusted. Then, the gravure roll 34 with the binder 18a adhering thereto in a prescribed amount is pressed against the metal foil 12a. As a result, the binder 18a is coated in a prescribed weight per unit area on the metal foil 12a.

<Binder 18a>

Herein, the binder 18a is a slurry in which particles resulting in a binding agent 50 (see FIG. 10) are dispersed in a solvent. In this embodiment, for the binder 18a, it is possible to use the same solvent as the negative electrode mixture to be supplied in the mixture supplying step. In this embodiment, as the solvent for the binder 18a, N-methyl-2-pyrrolidone (NMP) is used. The binding agent 50 contained in the binder 18a is styrene butadiene rubber (SBR). The solid content concentration of the slurry-form binder 18a to be coated in the binder coating step may be desirably adjusted to about 5 wt % to 20 wt %. In this embodiment, the solid content concentration of the slurry-form binder 18a is adjusted to about 13 wt %. Further, the viscosity of the slurry-form binder 18a may be desirably adjusted to about 50 mPa·sec to 2000 mPa·sec (E type viscometer, 25° C., at 2 rpm).

<Binding Agent 50>

In this embodiment, the particle diameter of the styrene butadiene rubber (SBR) contained in the binder preferably falls within the range of for example, about 60 nm to 200 nm. Herein, for the particle diameter, there is adopted the median diameter (d50) determined from the particle size distribution measured by the dynamic light scattering method. As the particle size distribution meter, for example, LB550 of HORIBA Ltd., can be used.

Herein, the binding agent 50 is not limited to SBR, and may be, for example, polyvinylidene difluoride (PVDF), polyethylene (PE), or polyacrylonitrile (PAN).

In the binder coating step, the slurry-form binder 18a is coated onto the metal foil 12a as a collector. In this embodiment, as described above, the binder coating device 18 is used. In a prescribed coating area in which the metal foil 12a is coated with the negative electrode mixture, the slurry-form binder 18a is printed in a given weight per unit area by solid coating. The weight per unit area before drying is adjusted so as to be about 0.020 mg/cm² to 0.030 mg/cm². By such a binder coating device 18, it is possible to coat the slurry-form binder 18a onto the metal foil 12a in a prescribed weight per unit area.

The thickness of the slurry-form binder 18a coated in the binder coating step may be desirably set at, for example, 1.0 μm to 10.0 μm before drying. When the slurry-form binder 18a is coated too thick, the contact between the metal foil 12a and graphite (negative electrode active material 710) is inhibited. This may cause an increase in resistance of the lithium ion secondary battery. For this reason, the thickness of the slurry-form binder 18a to be coated in the binder coating step may be desirably set at preferably 6.0 μm or less, and more preferably 4.5 μm or less.

In this embodiment, in the traveling path 12 of the metal foil 12a, a film thickness inspection unit 19 for inspecting the thickness of the slurry-form binder 18a coated by the binder coating device 18 is disposed downstream of the binder coating device 18. As the film thickness inspection unit 19, for example, an infrared thickness meter can be adopted. In such a binder coating step, the metal foil 12a coated with the slurry-form binder 18a is then fed to the mixture supplying step.

<Mixture Supplying Device 20 (Mixture Supplying Step)>

The mixture supplying step is a step of supplying the negative electrode mixture 20a containing graphite so as to be superposed on the slurry-form binder 18a coated on the metal foil 12a. In this embodiment, the mixture supplying device 20 includes, as shown in FIG. 9, a back roll 41, a die 42, a tank 43, a pump 44, and a filter 45. The back roll 41 is disposed along the traveling path 12, and is a roller for supporting the metal foil 12a. The die 42 has a discharge port for discharging the negative electrode mixture 20a. The tank 43 is a container for storing the negative electrode mixture 20a supplied in the mixture supplying step. The pump 44 is a device for supplying the negative electrode mixture 20a from the tank 43 to the die 42. The filter 45 is disposed at the supply path of the negative electrode mixture 20a fed from the tank 43 to the die 42.

The negative electrode mixture stored in the tank 43 is sucked up by the pump 44, and is supplied to the surface of the metal foil 12a supported by the back roll 41 via the die 42. In this embodiment, in the mixture supplying device 20, the graphite-containing negative electrode mixture 20a is supplied so as to be superposed on the slurry-form binder 18a coated on the metal foil 12a by the binder coating device 18. Further, in this embodiment, the negative electrode mixture 20a is supplied continuously to the metal foil 12a traveling along the traveling path 12.

Figure 10:
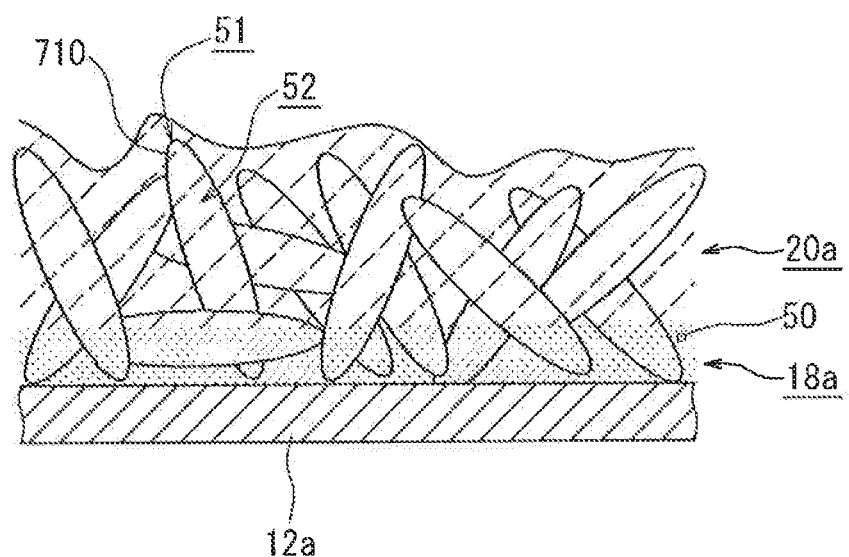
FIG. 10 is a schematic view showing a cross section of a collector after a mixture supplying step.

FIG. 10 shows a cross section of the metal foil 12a after such a mixture supplying step. As shown in FIG. 10, in this embodiment, the slurry-form binder 18a is coated on the surface of the metal foil 12a. The graphite-containing negative electrode mixture 20a is supplied so as to be superposed thereon. For this reason, the portion thereof in the vicinity of the surface of the metal foil 12a contains the binding agent 50 (in this embodiment, SBR) in a large amount. Such a negative electrode mixture 20a supplied so as to be superposed on the slurry-form binder 18a contains graphite in a large amount as the negative electrode active material 710. Incidentally, FIG. 10 schematically shows the cross section of the metal foil 12a after the mixture supplying step, in which the shape, size, and the like of the negative electrode active material 710 are different from actual ones.

<Negative Electrode Mixture 20a>

Herein, the negative electrode mixture 20a is a mixture containing graphite as the negative electrode active material 710. Herein, it is essential only that graphite is a material which can absorb and release lithium ions, and in which the edge part serving as an inlet port for lithium is oriented by the magnetic field. Such graphite desirably has, for example, a layered structure in which hexagonal platelet-shaped crystals are stacked one on another in such a manner as to form a plurality of layers. Specifically, it is possible to use carbon type materials such as natural graphite, artificial graphite, and amorphous carbon of natural carbon or artificial carbon. For the solvent of the negative electrode mixture 20a, either of an aqueous solvent or a non-aqueous solvent is usable. In this embodiment, N-methyl-2-pyrrolidone (NMP) is used. Further, in this embodiment, the negative electrode mixture 20a does not contain SBR as a so-called binding agent 50.

The negative electrode mixture 20a may contain a binding agent relatively not affected by migration as with, for example, PTFE. For example, PTFE can enhance the bonding force between graphites (negative electrode active materials 710).

Thus, with the method for manufacturing a lithium ion secondary battery, the negative electrode mixture 20a is supplied in a superposed manner before the slurry-form binder 18a is sufficiently dried. Namely, the state referred to as so-called "wet on wet" results. At this step, when the negative electrode mixture 20a is supplied in a superposed manner, the slurry-form binder 18a and the negative electrode mixture 20a desirably keep the two-layered state with a certain degree of stability.

For this reason, for example, if the viscosity of the slurry-form binder 18a is too low, or the slurry-form binder 18a is too thick, the layer of the slurry-form binder 18a is not kept when the negative electrode mixture 20a is supplied so as to be superposed on the slurry-form binder 18a. From such a viewpoint, the viscosity (Adv) of the slurry-form binder 18a to be coated in the binder coating step is preferably adjusted to 50 mPa·sec≤Adv. When the viscosity of the slurry-form binder 18a is too high, coating of the slurry-form binder is difficult, and is not proper. For this reason, Adv≤2000 mPa·sec is desirable. Thus, the viscosity (Adv) of the slurry-form binder 18a to be coated in the binder coating step preferably satisfies 50 mPa·sec≤Adv≤2000 mPa·sec. Herein, the viscosity shows the values measured under the conditions of 25° C. and 2 rpm using an E type viscometer. Further, the thickness of the slurry-form binder 18a may be desirably set at, for example, 1.0 μm to 10.0 μm, and preferably 1.0 μm to 8.0 μm before drying.

Further, as described above, when the negative electrode mixture 20a is supplied so as to be superposed on the slurry-form binder 18a, the slurry-form binder 18a and the negative electrode mixture 20a desirably keep the two-layered state with a certain degree of stability. For this reason, the surface tension of the slurry-form binder 18a is preferably higher than the surface tension of the negative electrode mixture 20a supplied so as to be superposed on the slurry-form binder 18a. The solid content concentration (Ads) of the slurry-form binder and the solid content concentration (Bds) of the negative electrode mixture 20a may be adjusted from the viewpoint of such a surface tension.

FIG. 10 shows graphite in a flat flake shape. Such graphite in a flat flake shape has an edge part 51 of exposed edges of a plurality of stacked layers of hexagonal platelet-shaped crystal. An outer surface 52 of stacked layers in a flat flake shape is also referred to as a basal plane. As shown in FIG. 10, the negative electrode active material 710 in the negative electrode mixture 20a is oriented in a given direction in a state supplied from the mixture supply device 20. For such graphite, the edge (edge part 51) of the hexagonal platelet-shaped crystal serves as an inlet port for lithium ions. Lithium ions enter from such an edge part into the hexagonal platelet-shaped crystal to be diffused into between a plurality of layers. In the mixture supplying step, the metal foil 12a supplied with the negative electrode mixture 20a is fed to the magnetic field applying step.

<Magnetic Field Applying Device 22 (Magnetic Field Applying)>

Then, the magnetic field applying step is a step of applying a magnetic field having magnetic lines of force pointing in a direction orthogonal to the plane of the collector having been supplied with the negative electrode mixture 20a, to the negative electrode mixture 20a having been supplied to the metal foil 12a as the collector. In this embodiment, the magnetic field applying device 22 embodying the magnetic field applying step is formed of a pair of magnets 61 and 62 disposed opposite to each other so as to interpose the metal foil 12a traveling on the traveling path 12 therebetween as shown in FIG. 9. In this embodiment, the magnets 61 and 62 may be each formed of a permanent magnet, or may also be an electromagnet generating a magnetic three by the electrical action. In this case, a magnetic field having magnetic lines of force pointing in the direction orthogonal to the metal foil 12a is desirably generated with respect to the metal foil 12a traveling on the traveling path 12. For this reason, a pair of the magnets 61 and 62 disposed opposite to each other so as to interpose the metal foil 12a therebetween may be disposed so that one is the S pole and the other is the N pole with respect to the metal foil 12a, respectively.

Figure 11:
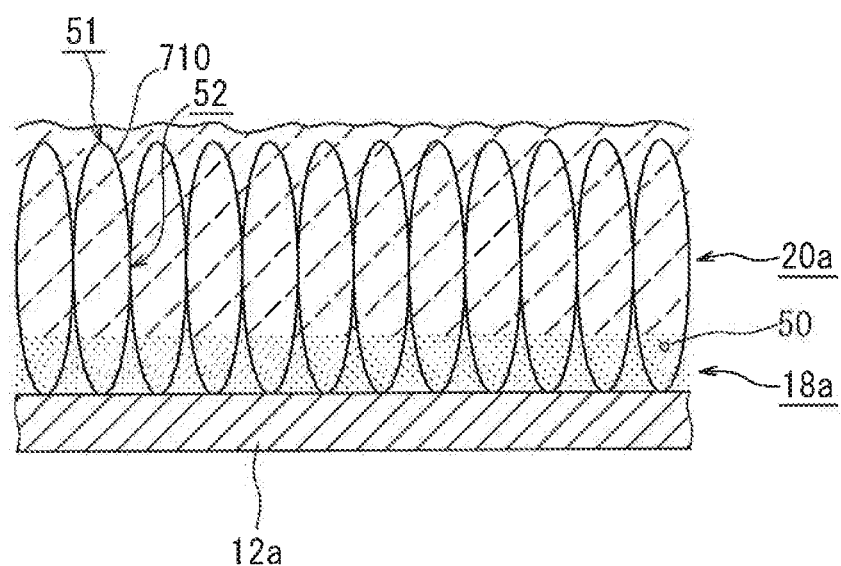
FIG. 11 is a schematic view showing a cross section of the collector after a magnetic field applying step.
Figure 14:
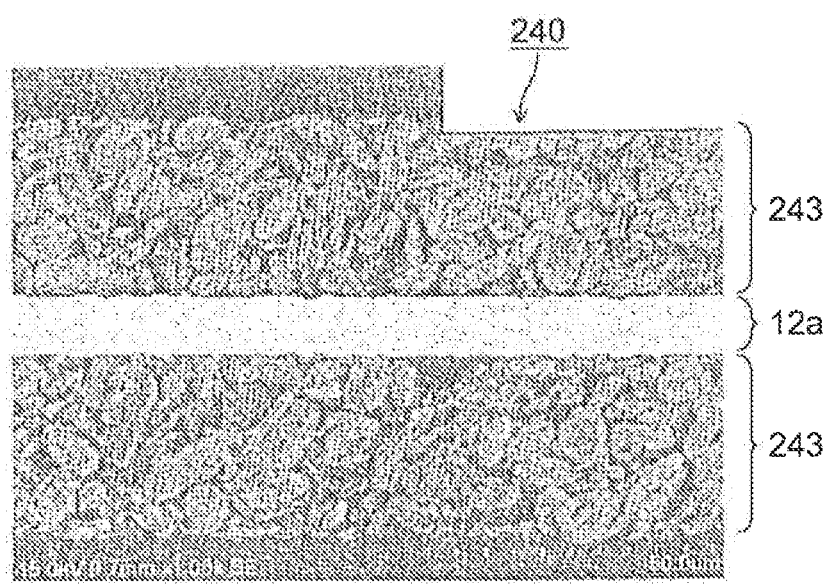
FIG. 14 is a cross-section SEM image of a negative electrode sheet manufactured by a method for manufacturing a lithium ion secondary battery in accordance with one embodiment of the present invention.

By such a magnetic field applying step, the negative electrode active material 710 in the negative electrode mixture 20a supplied to the metal foil 12a is oriented by the action of the magnetic field. FIG. 11 shows the cross section of the metal foil 12a after such a magnetic filed applying step. As shown in FIG. 11, in this embodiment, the slurry-form binder 18a is coated on the surface of the metal foil 12a, and the negative electrode mixture 20a containing graphite is supplied in a superposed manner thereon. When a magnetic field having magnetic lines of force pointing in the direction orthogonal to the metal foil 12a acts on such metal foil 12a, graphite is oriented in such a manner that the edge part points in the direction orthogonal to the metal foil 12a. From another viewpoint, orientation is achieved so that the plane of the hexagonal platelet-shaped crystal of graphite (the plane between the layers of graphite) is in parallel with the magnetic lines of force (the direction orthogonal to the metal foil 12a). FIG. 11 schematically shows the cross section of the metal foil 12a after the mixture supplying step. The shape and size of the negative electrode active material, and the like are different from actual ones. Further, the orientation of graphite as the negative electrode active material 710 is drawn in a quite extreme form for more ease of understanding. In actuality, orientation is not necessarily achieved so extremely. However, the edge parts of graphite are aligned in orientation in the direction orthogonal to the metal foil 12a to a certain degree (see FIG. 14). Herein, FIG. 14 is a cross-section SEM image of the negative electrode sheet 240 manufactured by the method for manufacturing a lithium ion secondary battery in accordance with one embodiment of the present invention.

The degree of orientation of graphite is considered to be affected by the intensity of the magnetic field acting on the negative electrode mixture 20a and the time for applying the magnetic field in the magnetic field apply step. In the magnetic field applying step, the intensity of the magnetic field allowed to act on the negative electrode mixture 20a, and the time for applying the magnetic field may be desirably adjusted so that graphite is properly oriented. The shorter the time for allowing a magnetic field to act on the negative electrode mixture 20a in the magnetic field applying step is, the better it is. For example, desirably, graphite is sufficiently oriented for a time as short as about 0.5 seconds. For this reason, the intensity of the magnetic field allowed to act on the negative electrode mixture 20a in the magnetic field applying step is 1.0 T or more, more preferably 1.5 T or more, and further 2.0 T or more in the vicinity of the traveling path 12 along which the negative electrode mixture 20a travels. The intensity of the magnetic field may be measured by a commercially available magnetism measuring instrument. As such a magnetism measuring instrument, for example, LakeShore 425 type can be used.

The degree of orientation of graphite is considered to be affected by the viscosity and the solid content concentration of the negative electrode mixture 20a to be supplied in the mixture supplying step. In the opinion of the present inventors, the viscosity of the negative electrode mixture 20a to be supplied herein is desirably, for example, 500 mPa·sec to 5000 mPa·sec (E type viscometer, 25° C., at 2 rpm). The solid content concentration of the negative electrode mixture to be supplied in the mixture supplying step is desirably 40 wt % to 60 wt %. The metal foil 12a on which the graphite in the negative electrode mixture 20a is oriented by the magnetic field applying step is fed along the traveling path 12 to the convection generating step. Further, the magnetic field applying step is desirably performed as immediately as possible after supply of the negative electrode mixture 20a onto the metal foil 12a in the mixture supplying step.

<Convection Generating Device 24 (Convection Generating Step)>

The convection generating step is a step of generating convection in the negative electrode mixture 20a by applying heat to the negative electrode mixture 20a to which a magnetic field has been applied in the magnetic field applying step. In this embodiment, with the convection generating device 24 embodying the convection generating step, as shown in FIG. 9, convection is desirably generated in the binder 18a and the negative electrode mixture 20a supplied onto the metal foil 12a. In this embodiment, the convection generating device 24 is formed of a drying furnace 71 disposed at the traveling path 12 for the metal foil 12a. At the drying furnace 71, desirably, the metal foil 12a is exposed to a high-temperature drying atmosphere to cause convection in the negative electrode mixture 20a.

Figure 12:
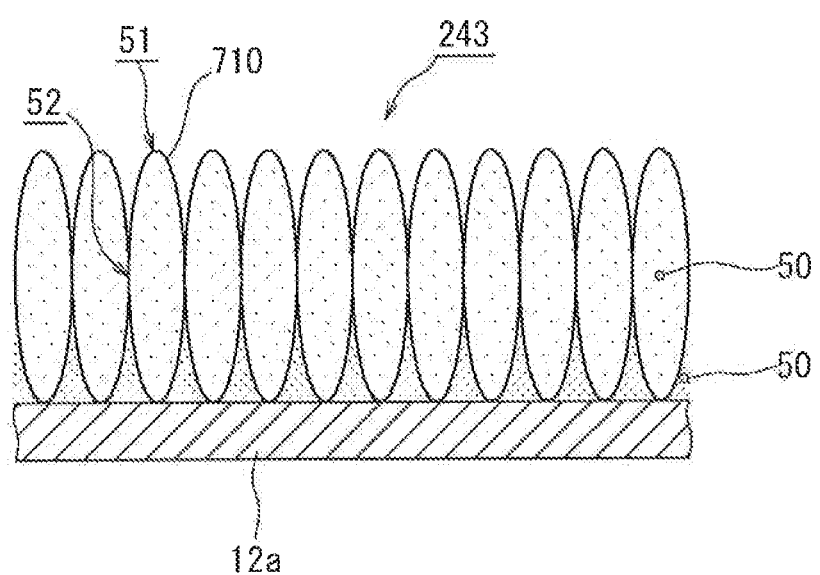
FIG. 12 is a schematic view showing a cross section of the collector after a convection generating step.

At this step, for example, as shown in FIG. 12, most of the binding agent 50 (in this embodiment, SBR) in the binder 18a coated on the surface of the metal foil 12a remains in the vicinity of the surface of the metal foil 12a. However, some moves toward the surface of the negative electrode mixture 20a, and the binding agent 50 is dispersed in the negative electrode mixture 20a. In this embodiment, the convection generating step is also a step of drying the negative electrode mixture 20a, so that the solvent component of the negative electrode mixture 20a is desirably evaporated to be vanished.

In this embodiment, the binding agent 50 (SBR) is not contained in the negative electrode mixture 20a, but the binding agent 50 (SBR) is contained in the slurry-form binder 18a coated on the collector 12a (metal foil 12a). In this case, in the convection generating step, some of the binding agent 50 in the binder 18a coated on the surface of the metal foil 12a moves toward the surface of the negative electrode mixture 20a, and is diffused therein. At this step, in the convection generating step, a required amount of heat may be desirably applied to the negative electrode mixture 20a. As a result, it is possible to obtain a negative electrode mixture layer 243 in which the binding agent 50 (in this embodiment, SBR) is present in a large amount in the vicinity of the surface of the metal foil 12a, and some of the binding agent 50 is widely diffused as shown in FIG. 12.

In this case, for example, the weight ratio of the binding agent is smaller in a portion from a level at half the thickness of the negative electrode mixture layer 243 to the surface of the negative electrode mixture layer 243 than in a portion from the surface of the collector 12a to a level at half the thickness of the negative electrode mixture layer 243. Desirably, for example, in the negative electrode mixture layer 243, the weight ratio of the binding agent is smaller in a portion from the surface of the collector 12a to a level at 50% to 70% of the thickness of the negative electrode mixture layer 243 than in a portion from the surface of the collector 12a to a level at 20% of the thickness of the negative electrode mixture layer 243 by 3% or more (more preferably 5% or more).

For example, when the thickness of the negative electrode mixture layer 243 is 1 mm, the portion from the surface of the collector 12a to a level at 20% of the thickness of the negative electrode mixture layer 243 is a portion from the surface of the collector 12a to 0.2 mm therefrom. The portion from the surface of the collector 12a to a level at 50% to 70% of the thickness of the negative electrode mixture layer 243 is a portion from the surface of the collector 12a to 0.5 mm to 0.7 mm therefrom. Thus, the weight ratio of the binding agent is smaller in the portion from the surface of the collector 12a to a level at 50% to 70% of the thickness of the negative electrode mixture layer 243 than in the portion from the surface of the collector 12a to a level at 20% of the thickness of the negative electrode mixture layer 243 by 3% or more. This more precisely indicates that the binding agent 50 (in this embodiment, SBR) is present in a large amount in the vicinity of the surface of the metal foil 12a.

For example, for the binding agent 50 (in this embodiment, SBR) in the negative electrode mixture layer 243, for example, a CP treatment (Cross Section Polisher treatment) provides a given cross section of the negative electrode mixture layer 243. The cross section is allowed to react with bromine or osnium. Bromine or osnium reacts with the secondary bond of SBR or an acrylic type binder, and is bonded to SBR or the acrylic type binder. Such bromine or osnium is subjected to quantitative analysis by EPMA (Electron Probe Micro Analysis). As a result, it is possible to measure at which portion of a given cross section of the negative electrode mixture layer 243 and to what extent of proportion the binding agent 50 exists.

Namely, in accordance with the method for manufacturing a lithium ion secondary battery, the step of coating the slurry-form binder 18a to the metal foil 12a as a collector (binder coating step) comes prior to the step in which the negative electrode mixture 20a is supplied (mixture supplying step). Then, in the magnetic field applying step, the negative electrode mixture 20a coated on the metal foil 12a is applied with a magnetic field having magnetic lines of force pointing in the direction orthogonal to the metal foil 12a. This can orient graphite (negative electrode active material 710). Further, the convection generating step causes convection in the negative electrode mixture 20a. With such convection, some of the binding agent 50 coated on the metal foil 12a moves toward the surface of the negative electrode mixture 20a. Thus, the binding agent 50 is dispersed in the negative electrode mixture 20a. The binding agent 50 coated on the metal foil 12a moves toward the surface of the negative electrode mixture 20a, but the binding agent 50 is left in the vicinity of the metal foil 12. For this reason, the negative electrode mixture layer 243 after drying is less likely to peel from the metal foil 12a. This contributes to the improvement of the performance stability and the cycle characteristics of the lithium ion secondary battery 100.

In this embodiment, even when convection occurs in the negative electrode mixture 20a, a large amount of the binding agent 50 is left in the vicinity of the metal foil 12a. This is assumed to be due to the following. As shown in FIG. 11, by the magnetic field applying step, the graphite (negative electrode active material 710) in the negative electrode mixture 20*a* is oriented. Accordingly, the arrangement of graphite (negative electrode active material 710) becomes dense. For this reason, even when convection occurs, the binding agent 50 becomes less likely to float.

Further, with the method for manufacturing a lithium ion secondary battery, as shown in FIG. 12, the edge part 51 of graphite (negative electrode active material 710) contained in the negative electrode mixture 20*a* faces the surface side. Such an edge part 51 is an inlet port through which lithium ions travel into and from the inside of the negative electrode active material 710. This leads to an improvement of the rate control of the reaction of lithium ions in the negative electrode mixture layer 243. This reduces the resistance of the lithium ion secondary battery 100, and contributes to implementation of higher output of the lithium ion secondary battery 100.

Figure 13:
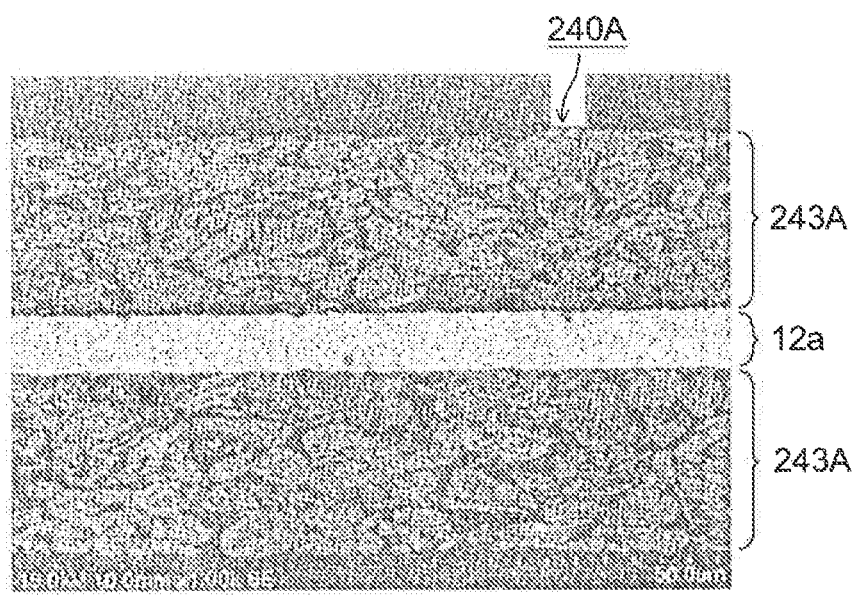
FIG. 13 is a cross-section SEM image of a negative electrode sheet not subjected to magnetic orientation.

Herein, FIG. 13 is a cross-section SEM image of a negative electrode sheet 240A when formed by mixing SBR as a binding agent in the negative electrode mixture, and not subjected to magnetic orientation. In this case, as shown in FIG. 13, in the negative electrode mixture layer 234A, the orientation of the negative electrode active material 710 becomes random.

In contrast, FIG. 14 is a cross-section SEM image of a negative electrode sheet 240 manufactured by the method for manufacturing a lithium ion secondary battery in accordance with one embodiment of the present invention. In this case, as shown in FIG. 14, in the negative electrode mixture layer 243, the negative electrode active material 710 is oriented in the direction orthogonal to the metal foil 12*a*. As shown in FIG. 14, by being magnetically oriented, the graphite as the negative electrode active material 710 is oriented so that the interlayer plane of layers of hexagonal platelet-shaped crystal is orthogonal to the surface of the collector.

Herein, "being oriented so that the interlayer plane of layers of hexagonal platelet-shaped crystal is orthogonal to the surface of the collector" means as follows: for graphite, the interlayer plane of layers of hexagonal platelet-shaped crystal roughly points in the direction orthogonal to the surface of the collector as compared with the case of random orientation. For this reason, the interlayer plane of layers of hexagonal platelet-shaped crystal may not be fully orthogonal to the surface of the collector.

The present inventors formed batteries for evaluation tests formed with four patterns referred to as ordinary electrode, magnetic orientation, precoating, and (magnetic field+precoating).

Ordinary electrode: manufacturing was performed by mixing SBR as a binding agent in a negative electrode mixture, and not subjecting the mixture to magnetic orientation;
Magnetic orientation: manufacturing was performed by mixing SBR as a binding agent in a negative electrode mixture, and subjecting the mixture only to magnetic orientation;
Precoating: manufacturing was performed by first coating the slurry-form binder 18*a* to the metal foil 12*a* (precoating), and coating the negative electrode mixture 20*a* in a superposed manner, and not subjecting the mixture to magnetic orientation; and
Magnetic field+precoating; the slurry-form binder 18*a* was first coated on the metal foil 12*a* (precoating), and the negative electrode mixture 20*a* was coated thereon in a superposed manner, and the mixture was subjected to magnetic orientation.

Herein, each battery for evaluation test was formed of a so-called 18650 type battery. The batteries for evaluation test were manufactured under the common conditions except for the foregoing conditions. Then, the battery for each evaluation test was measured for the peel strength of the negative electrode mixture layer, and the I-V resistance value at low temperatures (−10° C.).

Herein, the peel strength can be evaluated by, for example, the "90-degree peel test". For example, a 1-cm wide and strip-shaped sample is prepared. With the "90-degree peel test", a tape is bonded to the negative electrode mixture layer to fix the sample. Then, one end of the tape is lifted, and pulled by an autograph while keeping the tape at right angles with respect to the strip-shaped sample. Then, the peel strength is measured from the lifting strength (tension) resulting in peeling of the negative electrode mixture layer from the collector.

Further, for the I-V resistance value, the cell is adjusted to a charging state of SOC 30%, and a prescribed current value I (in this embodiment, 10 C) is passed for 4 seconds. The voltage drop $\Delta V$ at this moment is measured. From the relationship of $\Delta V = IR$, R as the I-V resistance value is calculated.

Figure 15:
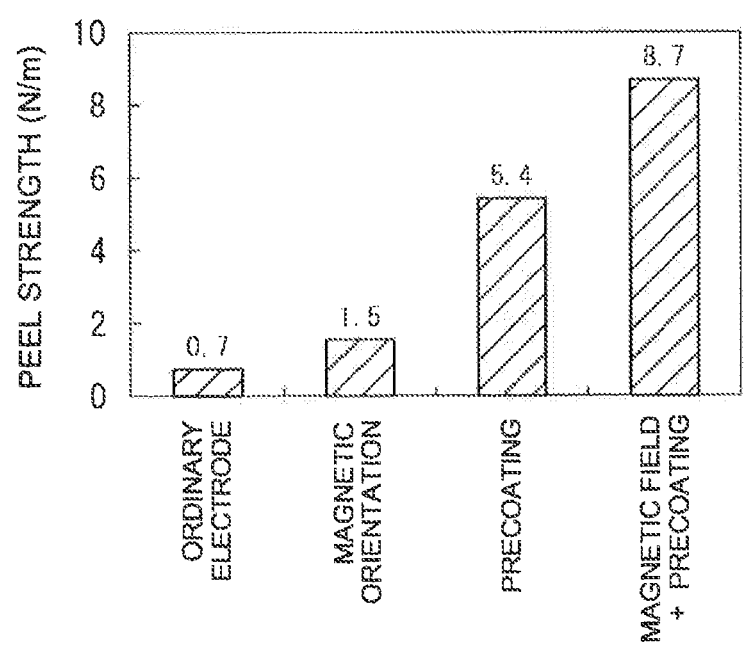
FIG. 15 is a graph showing peel strength in Comparative Test.
Figure 16:
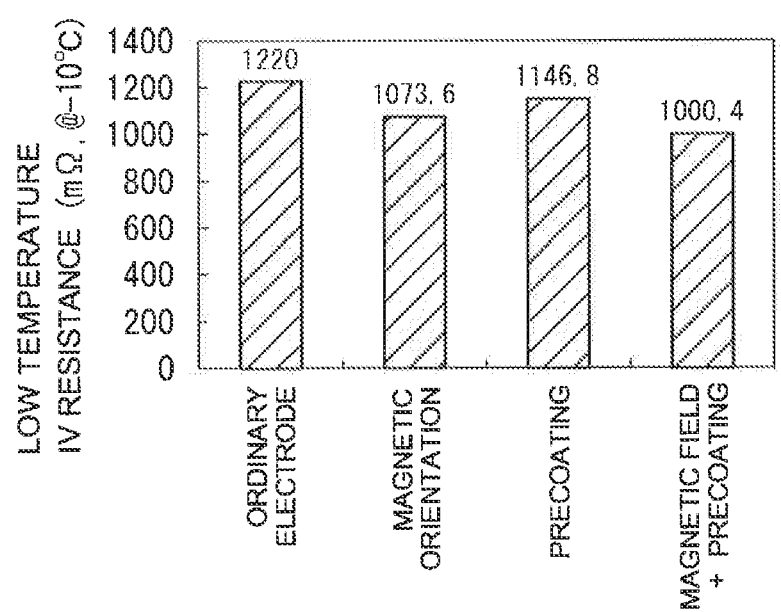
FIG. 16 is a graph showing I-V resistance values in Comparative Test.

FIGS. 15 and 16 show the peel strength and the I-V resistance value for each sample of ordinary electrode, magnetic orientation, precoating, and (magnetic field+precoating). As herein shown, for the battery for evaluation test using the ordinary electrode, the peel strength was 0.7 (N/m), and the I-V resistance value was 1220 m$\Omega$. For the battery for evaluation test by the magnetic orientation, the peel strength was 1.5 (N/m), and the I-V resistance value was 1073.6 m$\Omega$. Further, for the battery for evaluation test by the precoating, the peel strength was 5.4 (N/m), and the I-V resistance value was 1146.8 m$\Omega$. Still further, for the battery for evaluation test by the (magnetic field+precoating), the peel strength was 8.7 (N/m), and the I-V resistance value was 1000.4 m$\Omega$.

As shown in FIGS. 15 and 16, for the batteries for evaluation test using an electrode subjected to precoating and magnetic orientation, the peel strength tends to be high, and the I-V resistance value tends to be controlled low.

As described up to this point, with the method for manufacturing a lithium ion secondary battery in accordance with one embodiment of the present invention, as shown in FIG. 9, first, the slurry-form binder 18*a* is coated on the collector (metal foil 12*a*) (binder coating step (18)). Then, the negative electrode mixture 20*a* containing graphite (negative electrode active material 710) is supplied so as to be superposed on the slurry-form binder 18*a* (mixture supplying step (20)). Further, the negative electrode mixture 20*a* (see FIG. 10) is applied with a magnetic field having magnetic lines of force pointing in the direction orthogonal to the plane of the collector (metal foil 12*a*) supplied with the negative electrode mixture 20*a* (magnetic field applying step (22)). Further, heat is applied to the negative electrode mixture 20*a* applied with a magnetic field in the magnetic field applying step, and convection is generated in the negative electrode mixture 20*a* (convection generating step (24)).

In accordance with such a method for manufacturing a lithium ion secondary battery, the binding agent 50 in the negative electrode mixture layer 243 is present in a large amount in the vicinity of the metal foil 12*a*, and is partly diffused in the negative electrode mixture layer. Further, for the graphite (negative electrode active material 710) in the negative electrode mixture layer 243, the edge part 51 faces the direction orthogonal to the metal foil 12*a*. From another viewpoint, the plane of the hexagonal platelet-shaped crystal (interlayer plane of graphite) of graphite (negative electrode active material 710) becomes in roughly parallel with the magnetic lines of force (the direction orthogonal to the metal foil 12a). This results in a lithium ion secondary battery in which the negative electrode mixture layer 243 is less likely to peel from the metal foil 12a, and which exhibits a low resistance and a high output. Further, in this embodiment, even when convection occurs, a large amount of the binding agent 50 is left in the vicinity of the metal foil 12a. Accordingly, more heat can be applied to the negative electrode mixture 20a in the convection generating step. For this reason, the negative electrode mixture 20a can be dried at a higher speed.

Graphite (negative electrode active material 710) may have, for example, a layered structure in which hexagonal platelet-shaped crystals are stacked one on another in such a manner as to form a plurality of layers. Further, graphite (negative electrode active material 710) may have a flat flake shape. Such graphite (negative electrode active material 710) is oriented so that the edge part 51 points in the direction orthogonal to the metal foil 12a. This enhances the rate control of lithium ions, resulting in a low-resistance and high-output lithium ion secondary battery.

Further, the slurry-form binder 18a may contain SBR. In this embodiment, a large amount of the binding agent 50 in the slurry-form binder 18a is left in the vicinity of the metal foil 12a. SBR is preferable as a binding agent contributing to binding between the metal foil 12a and graphite (negative electrode active material 710). Inclusion of SBR in the slurry-form binder 18a makes it difficult for the negative electrode mixture layer 243 to peel from the metal foil 12a.

In the binder coating step, as described above, the slurry-form binder 18a may be coated on the metal foil 12a by gravure printing. Gravure printing enables thin solid coating of the slurry-form binder 18a. Thus, it is easy to adjust the weight per unit area of the slurry-form binder 18a. The binder coating step can desirably coat the slurry-form binder 18a in a prescribed weight per unit area, and does not depend on the gravure printing.

Further in the embodiment, the negative electrode mixture 20a to be supplied in the mixture supplying step does not contain a binding agent. In this case, the amount of the binding agent 50 in the negative electrode mixture layer 243 can be reduced. The amount of the binding agent 50 in the negative electrode mixture layer 243 is small. This results in a low possibility that the binding agent 50 blocks the edge part 51 of the negative active material 710. This enhances the rate control of lithium ions, resulting in a low-resistance and high-output lithium ion secondary battery. Further, the amount of the binding agent 50 to be used can be reduced. This can suppress the manufacturing cost of a lithium ion secondary battery at a low cost.

Further in the embodiment, the magnetic field applying device 22, and the convection generating device 24 (drying furnace) are separately disposed. Thus, the magnetic field applying step and the convection generating step are performed at different timings.

<Lithium Ion Secondary Battery Manufacturing Apparatus 10A>

Figure 17:
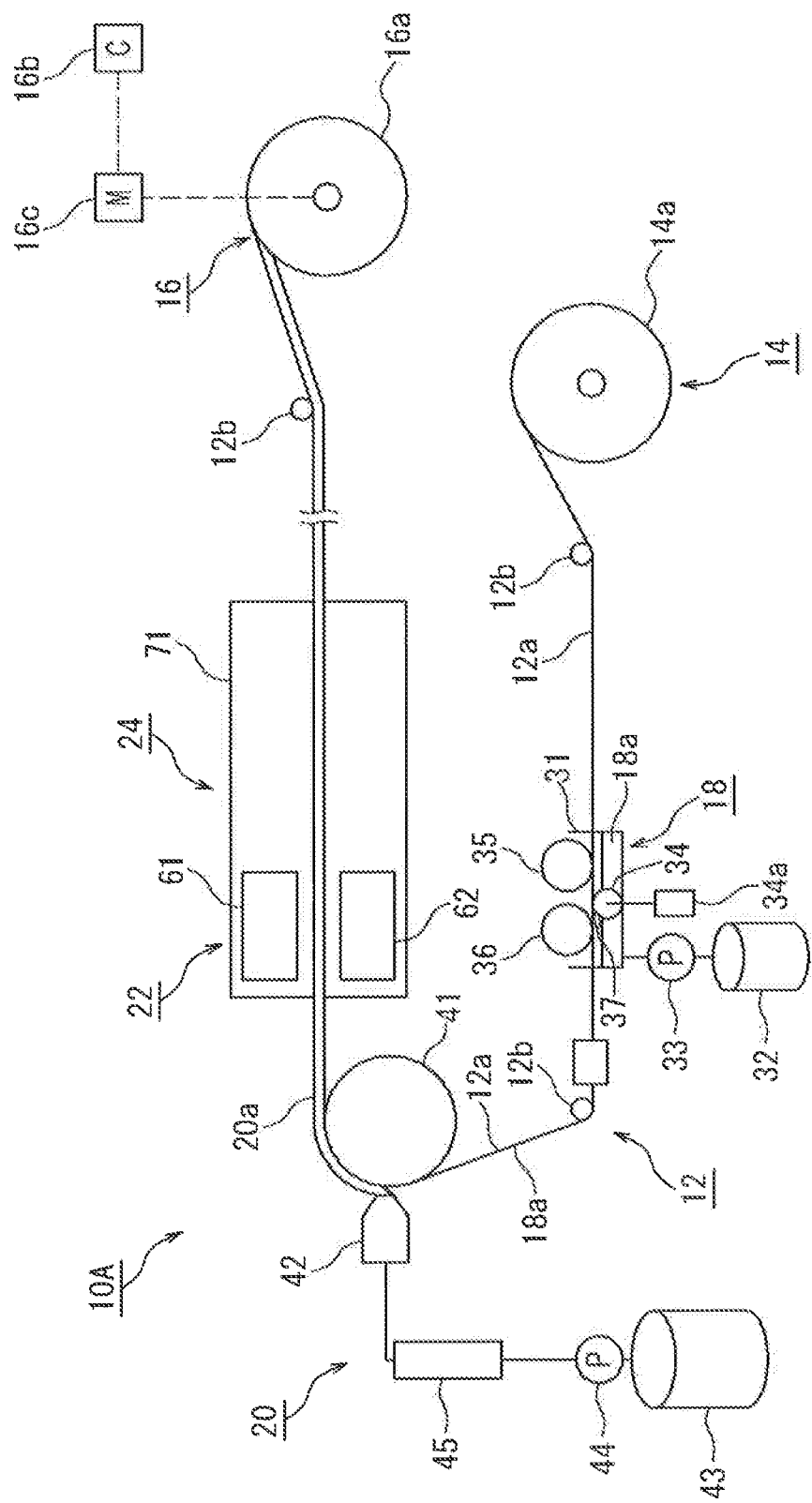
FIG. 17 is a view showing an apparatus for manufacturing a lithium ion secondary battery in accordance with another embodiment of the present invention.

In contrast, in another embodiment, for example, as shown in FIG. 17, the magnetic field applying device 22 may be disposed in the convection generating device 24 (drying furnace). In this case, the magnetic field applying device 22 may be desirably disposed in the vicinity of the inlet port of the convection generating device 24 (drying furnace) in the convection generating device 24 (drying furnace). With such a lithium ion secondary battery manufacturing apparatus 10A, by applying a proper magnetic field to the negative electrode mixture 20a, the magnetic orientation is performed for a time as short as about 0.5 second. The magnetic field applying device 22 is disposed in the convection generating device 24 (drying furnace). For this reason, the convection generating device 24 can dry the negative electrode mixture 20a in a magnetically oriented state. This makes it easy for the negative electrode mixture 20a to become likely to keep the state in which graphite (negative electrode active material 710) is magnetically oriented. Thus, the magnetic field applying step and the convection generating step may be performed at roughly the same timing.

<Lithium Ion Secondary Battery Manufacturing Apparatus 10>

Further, as described above, the lithium ion secondary battery manufacturing apparatus 10 desirably includes, for example, as shown in FIG. 9, a traveling path 12 having guides allowing a collector (metal foil 12a) to travel along a prescribed path on a supplying unit 14 for supplying the metal foil 12a to the traveling path 12, and a retrieving unit 16 for retrieving the metal foil 12a from the traveling path 12. Then, along the traveling path 12, it is possible to provide a binder coating device 18, a mixture supplying device 20, a magnetic field applying device 22, and a convection generating device 24.

Herein, the binder coating device 18 is a device for coating a slurry-form binder to the metal foil 12a. The mixture supplying device 20 is a device for supplying a negative electrode mixture 20a containing graphite (negative electrode active material 710) so as to be superposed on the slurry-form binder 18a coated on the metal foil 12a. The magnetic field applying device 22 is a device for applying a magnetic field having magnetic lines of force pointing in the direction orthogonal to the metal foil 12a, to the negative electrode mixture 20a coated on the metal foil 12a by the mixture supplying device 20. Further, the convection generating device 24 is a device of applying heat to the negative electrode mixture 20a to which a magnetic field has been applied, and generating convection in the negative electrode mixture 20a. By such a lithium ion secondary battery, it is possible to manufacture a lithium ion secondary battery in which the negative electrode mixture layer 243 is less likely to peel from the metal foil 12a, and which exhibits a low resistance and a high output.

In the lithium ion secondary battery herein manufactured, for example, by migration, the binding agent 50 agglomerates to the surface of the negative electrode mixture layer 243. Thus, the binding agent 50 is less likely to be depleted in the vicinity of the metal foil 12a. Namely, in the lithium ion secondary battery herein manufactured, for example, as shown in FIG. 12, the negative electrode mixture layer 243 contains graphite (negative electrode active material 710), and the binding agent 50. For example, the weight ratio of the binding agent is smaller in a portion from a level at half the thickness of the negative electrode mixture layer 243 to the surface of the negative electrode mixture layer 243 than in a portion from the surface of the collector 12a to a level at half the thickness of the negative electrode mixture layer 243. Further, graphite (negative electrode active material 710) is configured such that the interlayer plane of layers of hexagonal platelet-shaped crystals is orthogonal to the surface of the collector. In this case, for example, desirably, in the negative electrode mixture layer 243, the weight ratio of the binding agent is smaller in a portion from the surface of the collector 12a to a level at 50% to 70% of the thickness of the negative electrode mixture layer 243 than in a portion from the surface of the collector 12a to 20% of the thickness of the negative electrode mixture layer 243 by 3% or more (more preferably 5% or more). Namely, the negative electrode mixture layer 243 contains the binding agent 50 in a large amount in a portion thereof in the vicinity of the surface of the metal foil 12a (collector), and contains the binding agent 50 in a small amount in a portion away from the metal foil 12a (collector). Orientation is achieved with the edge part of the graphite (negative electrode material 710) pointing to the surface side of the negative electrode mixture layer 243. For this reason, in the lithium ion secondary battery, the negative electrode mixture layer 243 is less likely to peel from the metal foil 12a, and low-resistance and high-output battery performances are exerted.

Up to this point, a description was given to the method for manufacturing a lithium ion secondary battery, the device for manufacturing a lithium ion secondary battery, and a lithium ion secondary battery, in accordance with one embodiment of the present invention. The present invention is not limited to any embodiment described above unless otherwise specified.

Figure 18:
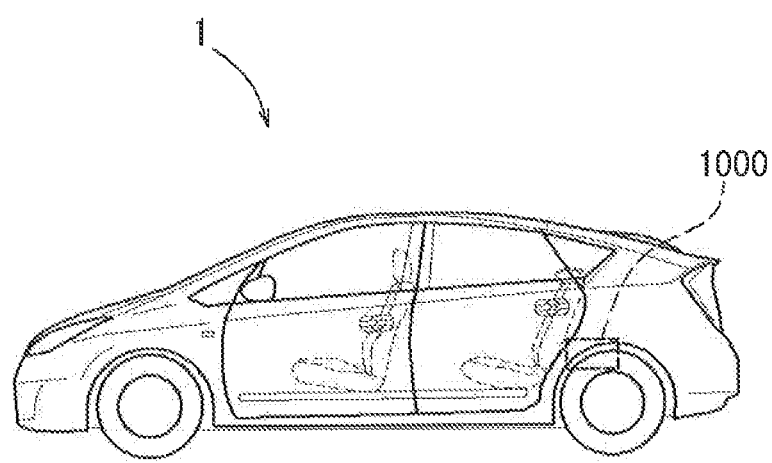
FIG. 18 is a view showing a vehicle equipped with a lithium ion secondary battery.

As described above, the present invention can contribute to the improvement of output of the lithium ion secondary battery. For this reason, the present invention is suitable for a method for manufacturing a lithium ion secondary battery for vehicle driving power source such as a battery for driving a hybrid vehicle or an electric vehicle, required to have a particularly high level in output characteristics and cycle characteristics at a high rate. Namely, the lithium ion secondary battery is preferably usable, for example, as shown in FIG. 18, as a battery 1000 for driving a motor (electric motor) of a vehicle 1 such as a car. The vehicle driving battery 1000 may be an assembled battery of a combination of a plurality of secondary batteries.

REFERENCE SIGNS LIST 10, 10A Manufacturing apparatus
12 Traveling path
12a Collector (metal foil)
12b Guide
14 Supplying unit
14a Winding core
16 Retrieving unit
16a Winding core
16b Control unit
16c Motor
18 Binder coating device (binder coating step)
18a Slurry-form binder
19 Film thickness inspection unit
20 Mixture supplying device (mixture supplying step)
20a Negative electrode mixture
22 Magnetic field applying device (magnetic field applying step)
24 Convection generating device (convection generating step)
31 Binder accommodating container
32 Tank
33 Pump
34 Gravure roll
34a Motor
35, 36 Transport roll
37 Blade
40 Charger
41 Back roll
42 Die
43 Tank
44 Pump
45 Filter
50 Binding agent
51 Edge part
52 Outer surface (basal plane)
61, 62 Magnet
71 Drying furnace
100 Lithium ion secondary battery
200 Wound electrode body
220 Positive electrode sheet
221 Positive electrode collector
222 Uncoated part
222a Intermediate portion
223 Positive electrode mixture layer
224 Positive electrode mixture
240, 240A Negative electrode sheet
241 Negative electrode collector
242 Uncoated part
243, 243A Negative electrode mixture layer
244 Negative electrode mixture
245 Heat-resistant layer
262 Separator
264 Separator
280 Electrolyte
300 Battery case
310 Gap
320 Container main body
322 Juncture between lid and container main body
340 Lid
360 Safety valve
420 Electrode terminal (positive electrode)
440 Electrode terminal (negative electrode)
610 Positive electrode active material
620 Conductive material
630 Binder
710 Negative electrode active material
730 Binder
1000 Vehicle driving battery

The invention claimed is:

1. A method for manufacturing a lithium ion secondary battery, comprising:
a binder coating step of coating a slurry-form binder containing a binding agent on a collector;
a mixture supplying step of supplying a negative electrode mixture containing graphite, so as to be superposed on the slurry-form binder before the slurry-form binder having been coated on the collector in the binder coating step is dried;
a magnetic field applying step of applying a magnetic field having magnetic lines of force pointing in a direction orthogonal to a plane of the collector having been supplied with the negative electrode mixture, to the negative electrode mixture having been supplied to the collector in the mixture supplying step;
a convection generating step of generating convection in the negative electrode mixture by applying heat to the negative electrode mixture to which the magnetic field has been applied in the magnetic field applying step;
wherein the slurry-form binder to be coated in the binder coating step has a viscosity (Adv) satisfying 50 mPa·sec≤Adv≤2000 mPa·sec;
the slurry-form binder to be coated in the binder coating step has a thickness (At) satisfying 1.0 μm≤At≤4.5 μm;
the magnetic field applying step and the convection generating step are performed at the same timing, thereby to apply a magnetic field having magnetic lines of force pointing in a direction orthogonal to the collector, to the negative electrode mixture having been coated on the collector in the mixture supplying step, and to generate convention by applying heat to the negative electrode mixture;

in the convection generating step, generating convection in the negative electrode mixture by applying heat to the negative electrode mixture by a convection generating device comprising a drying furnace, and in the magnetic field applying step, applying the magnetic field having magnetic lines of force pointing in a direction orthogonal to the collector, to the negative electrode mixture by a magnetic field applying device disposed in the convection generating device.

2. The method for manufacturing a lithium ion secondary battery according to claim 1, wherein the graphite has a layered structure including hexagonal platelet-shaped crystals stacked one on another in such a manner as to form a plurality of layers.

3. The method for manufacturing a lithium ion secondary battery according to claim 1, wherein the graphite has a flat flake shape.

4. The method for manufacturing a lithium ion secondary battery according to claim 1, wherein the binding agent is styrene-butadiene rubber (SBR).

5. The method for manufacturing a lithium ion secondary battery according to claim 1, wherein the slurry-form binder to be coated in the binder coating step has a solid content concentration (Ads) satisfying 5 wt %≤Ads≤20 wt %.

6. The method for manufacturing a lithium ion secondary battery according to claim 1, wherein in the binder coating step, the slurry-form binder is coated on the collector by gravure printing.

7. The method for manufacturing a lithium ion secondary battery according to claim 1, wherein the negative electrode mixture to be supplied in the mixture supplying step is free from a binding agent.

8. The method for manufacturing a lithium ion secondary battery according to claim 1, wherein the negative electrode mixture to be supplied in the mixture supplying step has a viscosity (Bdv) satisfying 500 mPa·sec≤Bdv≤5000 mPa·sec.

9. The method for manufacturing a lithium ion secondary battery according to claim 1, wherein the negative electrode mixture to be supplied in the mixture supplying step has a solid content concentration (Bds) satisfying 40 wt %≤Bds≤60 wt %.

* * * * *